United States Patent [19]
Frisch, Jr. et al.

[11] Patent Number: 6,046,295
[45] Date of Patent: Apr. 4, 2000

[54] ROOM TEMPERATURE CURABLE SILANE-TERMINATED POLYURETHANE DISPERSIONS

[75] Inventors: Kurt C. Frisch, Jr., Fridley; Bruce H. Edwards, White Bear Lake, both of Minn.; Ashok Sengupta, London, Canada; Lowell W. Holland, St. Paul Park; Richard G. Hansen, St. Paul, both of Minn.; Ian R. Owen, River Falls, Wis.

[73] Assignee: 3M Innovative Properties Company, St. Paul, Minn.

[21] Appl. No.: 08/705,385

[22] Filed: Aug. 30, 1996

Related U.S. Application Data

[62] Division of application No. 08/557,385, Nov. 13, 1995, Pat. No. 5,554,686, which is a continuation of application No. 08/109,640, Aug. 20, 1993, abandoned.

[51] Int. Cl.$^7$ .................................................. C08G 77/06
[52] U.S. Cl. ..................................................... 528/28
[58] Field of Search .................................... 528/28

[56] References Cited

U.S. PATENT DOCUMENTS

| | | | |
|---|---|---|---|
| 3,179,713 | 4/1965 | Brown | 528/25 |
| 3,627,722 | 12/1971 | Seiter | 528/28 |
| 3,632,557 | 1/1972 | Brode et al. | 528/28 |
| 3,640,924 | 2/1972 | Hermann et al. | 528/49 |
| 3,814,716 | 6/1974 | Kowalski et al. | 524/800 |
| 3,941,733 | 3/1976 | Chang | 528/48 |
| 4,567,228 | 1/1986 | Gaa et al. | 524/588 |
| 4,582,873 | 4/1986 | Gaa et al. | 524/591 |
| 4,598,131 | 7/1986 | Prucnal | 525/440 |
| 4,628,076 | 12/1986 | Chang et al. | 525/440 |
| 5,041,494 | 8/1991 | Franke et al. | 524/588 |
| 5,047,294 | 9/1991 | Schwab et al. | 428/432.1 |
| 5,225,267 | 7/1993 | Ochi et al. | 428/214 |
| 5,354,808 | 10/1994 | Onwumere et al. | 524/837 |
| 5,539,045 | 7/1996 | Potts et al. | 528/28 |
| 5,554,686 | 9/1996 | Frisch, Jr. et al. | 528/28 |
| 5,756,633 | 5/1998 | Larson | 528/28 |

FOREIGN PATENT DOCUMENTS

| | | | |
|---|---|---|---|
| 0 163 214 B1 | 12/1985 | European Pat. Off. . | |
| 0 305 833 B1 | 3/1989 | European Pat. Off. | C08F 8/42 |
| 0 315 006 B1 | 5/1989 | European Pat. Off. | C08G 18/38 |
| 93-3321 | 5/1993 | South Africa . | |
| WO 90/10026 | 9/1990 | WIPO | C08G 18/12 |

*Primary Examiner*—Peter A. Szekely

[57] ABSTRACT

This invention provides aqueous dispersions of externally chain extended polyurethane compositions terminated by hydrolyzable and/or hydrolyzed silyl groups and containing anionic solubilizing or emulsifying groups, particularly carboxyl groups. The invention also provides methods of making both anionically and cationically stabilized polyurethane dispersions. This invention further provides polyurethane dispersions which are substantially organic solvent free, (e.g. less than about 7 weight percent organic solvent) which cure to water and solvent resistant, tough, scratch resistant, preferably light stable (non-yellowing) polyurethane films. Such films are particularly useful as coatings for wood substrates, including wood floorings, furniture, and marine surfaces.

16 Claims, No Drawings

ROOM TEMPERATURE CURABLE SILANE-TERMINATED POLYURETHANE DISPERSIONS

This is a division of application Ser. No. 08/557,385 filed on Nov. 13, 1995, now U.S. Pat. No. 5,554,686, which is a continuation of application Ser. No. 08/109,640 filed on Aug. 20, 1993, now abandoned.

FIELD OF THE INVENTION

This invention relates to aqueous dispersions of externally chain extended polyurethane compositions terminated by hydrolyzable and/or hydrolyzed silyl groups and containing anionic solubilizing or emulsifying groups, particularly carboxyl groups. The invention also relates to methods of making both anionically and cationically stabilized polyurethane dispersions. This invention further relates to polyurethane dispersions which are substantially organic solvent free (e.g. less than about 7 weight percent organic solvent) which cure to water and solvent resistant, tough, scratch resistant, preferably light stable (non-yellowing) polyurethane films and which can be formulated to achieve high gloss. Such films are particularly useful as coatings for wood substrates, including wood floorings, furniture, and marine surfaces.

BACKGROUND OF THE INVENTION

It is well known to treat substrates such as wood with polyurethanes or alkyd resins. Polymers are generally applied either neat or from solvent solution as one-part or two-part systems. Frequently, isocyanate terminated polymers are used. The toxicological problems associated with free monomeric isocyanates are well known. It is desirable to make a coating where the end user is not exposed to free monomeric isocyanates.

In addition, the use of solvents creates problems of pollution, toxicity, and flammability and increases the cost of formulating and processing polyurethane materials. Solvents, however, are often required in the preparation and handling of polyurethane resins to sustain a controllable and processible viscosity.

Many of the known references emphasize polyurethane materials which are unstable to water and are generally kept from contact with water until after application to the surface being treated, e.g., leather. Thus, U.S. Pat. No. 3,179,713 (Brown) describes the surface treatment of leather with polysiloxanes containing isocyanate radicals as terminal groups. These are employed in amounts of 10–75% by weight with triorganosilyl endblocked diorganopolysiloxanes. The resulting product has all the characteristics of a siloxane-treated leather, except that the reactive isocyanate groups are stated to provide better bonding. Such compositions must be applied from solvent and must be protected from exposure to moisture prior to application to the leather. The compositions are applied at 15% to 25% by weight of the leather.

A class of moisture-curable silyl group-containing polymers is described by Brode et al., U.S. Pat. No. 3,632,557. The polymers are described as "vulcanizable" and are formed as films and plaques which cure by exposure to atmospheric moisture. Because of this sensitivity, the patentee taught that care had to be exerted at all times to avoid premature exposure to moisture. A polyurethane sealant containing alkoxysilyl terminating groups is described by Seiter, U.S. Pat. No. 3,627,722.

Latex polymers which are vinyl addition polymers formed by free radical polymerization and comprise vinyl hydrolyzable silane, an ester of the group of acrylic, maleic and fumaric esters and/or vinyl acetate are described by Kowalsli et al. in U.S. Pat. No. 3,814,716. These are dispersed in water using anionic or nonionic surfactants and are said to be useful to give durable coatings on various substrates which are generally rigid. It is known that the introduction of surfactants to such systems enhances the hydrophilicity of latices stabilized in this manner, leading to a reduced moisture resistance and surface adhesion of such coatings.

Gaa et al., U.S. Pat. No. 4,582,873 describes a process for making an aqueous dispersible, polyurethane polymer which has internal pendant, siliconate anions. The aqueous dispersion is prepared from a reaction product of polyisocyanates, organic compounds with at least 2 active hydrogens, a hydrophilic additive, and organosilane which is at least monofunctional, preferably difunctional, in reaction with isocyanate groups on at least one organic moiety of the organosilane and also has at least one hydrolyzed or hydrolyzable groups associated with the silicone atom. The hydrophilic additive, which is present at a level of up to about 10 weight percent of the prepolymer or polymer depending on the hydrophilicity of the polyisocyanates employed, assists in promoting the emulsification and stability of the disclosed aqueous dispersions. The aqueous dispersion of the polyurethane resin is used in coating a variety of substrates such as inorganic oxide substrates.

Gaa, European Patent Appl. 0305833 B1, discloses a silane terminated hydrophilic material based on vinyl alcohol and copolymers thereof as well as sugars, which may be a solution or dispersion.

U.S. Pat. No. 5,041,494 (Franke et al.) discloses a cationically stabilized silane terminated polyurethane made with hydrophilic polyether compounds and, optionally, externally added alcoholic, aminic and/or hydrazinic chain lengthening agents. These polyurethanes are made via a volatile organic solvent process, wherein the volatile organic solvent is introduced early in the polyurethane prepolymer formation and which must be stripped from the final product via an additional step.

One means for reducing the moisture sensitivity that arises due to the addition of these dispersant stabilizers in polyurethane dispersions, such as nonionic, cationic, and anionic surfactants and other hydrophilic additives, is through the use of external crosslinkers. Such external crosslinking agents, added to improve hydrophobicity of the coatings stabilized using these hydrophilic additives, can lead to other handling and processing problems, including limited potlife and potential toxicity problems associated with some of the commonly employed crosslinking agents.

U.S. Pat. No. 3,941,733 (Chang) describes dispersions of polyurethane containing pendant water-solubilizing groups and terminated by hydrolyzable or hydrolyzed silyl groups which can form self-supporting films and coatings on webs. Such water-solubilizing groups are introduced to the polyurethane through the reaction of a stoichiometric excess of an isocyanate-terminated prepolymer with a water-solubilizing compound which, in addition to the water-solubilizing group, has two isocyanate-reactive hydrogen atoms. To form higher molecular weight poly(urethane-ureas), Chang internally chain extends with the water to form multiplicities of chain extending urea linkages rather than incorporating externally added chain extenders. Leather coated with one of these compositions has excellent wear-resistance.

The inclusion of water-solubilizing compounds, such as diol acids, in conjunction with salt-forming compounds, such as tertiary amines, in polyurethane compositions has been described by Herman et al., in U.S. Pat. No. 3,640,924. The intermediates are emulsified in the presence of salt-forming compounds and thickeners are added to give curable adhesives.

Polyurethanes have also achieved commercial acceptance in wood finishing systems because of their overall balance of properties, such as abrasion resistance, flexibility, toughness, high gloss, as well as mar and solvent resistance. Early commercial systems were either solvent based reactive high solids prepolymers reacted with a second component, solvent-based moisture curing compositions, or fully reacted urethane lacquers generally dissolved in alcohols and/or aromatic solvents.

In an effort to eliminate solvents and their associated emission and handling problems, waterborne urethane wood coatings were developed. One means established for approaching the performance of solventborne polyurethanes in a waterborne composition has been to add an external crosslinker to the polyurethane dispersions. While these additives do improve the durability of such two-part coatings, crosslinked compositions unfortunately also present problems of limited pot life and potential toxicity due to the chemical nature of many of the standard external crosslinkers (e.g., multifunctional isocyanate and aziridine crosslinking agents).

The primary function of clear wood finishes is to enhance the natural beauty and protect wood surfaces from cumulative weathering effect of sunlight and moisture. Silicone containing finishes are preferred for use in harsh marine applications to protect wood above the water line from exposure to sun, rain, and salt-fog. However, the adhesion of silicones to oil woods, like teak, is poor. For teak, known polyurethane coatings adhere well but experience degradation upon exposure to sunlight. Wood continually undergoes dimensional changes caused by fluctuations in humidity and temperature in the use environment. The rate and magnitude of these changes can be controlled to some degree by the moisture permeability of the coating. Therefore, a wood coating must have sufficient elasticity to expand and contract with the wood, yet have adequate adhesion to resist the interfacial stress generated by the differential movement between the coating and wood surface. Coatings having a low modulus of elasticity will generate less interfacial stress for a given amount of movement than those with a high modulus. Hydrophilic coatings are plasticized by adsorbed water which increases their elasticity and peel tendency.

The weathering of wood proceeds by a series of complex, free-radical chemical reactions. The free radicals are photolytically generated in wood by both ultraviolet (UV) and visible light. Small amounts of moisture (0 to 6%) increase the concentration of free-radicals. These radicals rapidly react with atmospheric oxygen to oxidize (degrade) the wood surface. While UV light stabilized, clear wood finish coatings can slow the ingress of moisture and light and thus retard the degradation process to some degree, eventually the wood at the interface deteriorates causing the coating to flake and chip-off the surface. The rate of these degradation reactions is a function of the finish film composition and moisture adsorption/permeation.

SUMMARY OF THE INVENTION

It would be desirable to have the advantages of silicon-containing groups, particularly curability, in a polyurethane composition which is not sensitive to water. A need thus exists for a stable, curable composition containing polyurethane and silyl groups which is not sensitive to moisture before application and which reduces the content of expensive and polluting solvents for application. A need also exists for silyl group-containing polyurethanes which are film-forming. A need also exists for a method of producing low viscosity polyurethane dispersions which are stable to shear as to be mechanically pumpable. A need also exists for substantially organic solvent free water and solvent resistant, scratch resistant, and non-yellowing polyurethane films.

We have discovered that hydrolyzable and/or hydrolyzed silyl-terminated polyurethanes in aqueous dispersion which have excellent stability and which are useful as film-forming and coating materials. The term polyurethane, or sometimes polyurethane-polyurea, refers to a polymeric material, the backbone of which comprises a multiplicity of urethane linkages,

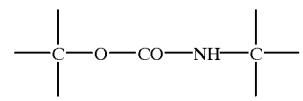

and may also contain one or more urea linkages:

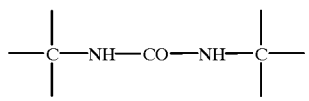

and may also contain one or more thiocarbamate linkages:

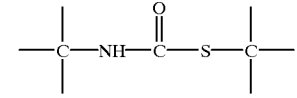

and combinations thereof.

Aqueous polyurethane dispersions of the invention are found to be stable to shear, to have enhanced chemical and mechanical stability, and to have relatively low viscosities even at high polymer concentrations. They present reduced hazards and costs as compared to known polyurethane solutions because of their lower solvent contents. Because they are aqueous, there are no problems associated with continuous maintenance of anhydrous conditions prior to use. Films formed from these dispersions are free from the problems associated with the presence of surfactants which are encountered with films formed from conventional externally emulsified dispersions. External crosslinking agents (the toxicity problems of which were discussed in the Background of the Invention), may be used, but are not required.

The anionically stabilized polymer composition of the invention comprises polymer of the formula (I)

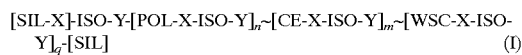

wherein [POL-X-ISO-Y], [CE-X-ISO-Y] and [WSC-X-ISO-Y] can be randomly distributed or form blocks;

wherein
SIL represents

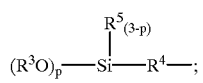

R³ is selected from the group consisting of hydrogen, alkyl radicals comprising about 1 to about 4 carbon atoms; acyl groups comprising about 2 to about 5 carbon atoms; and oxime groups of the formula —N═CR⁵R⁶, wherein R⁵ is a monovalent alkyl group comprising about 1 to about 12 carbon atoms and wherein R⁶ is a monovalent alkyl group comprising about 1 to about 12 carbon atoms;

R⁴ is a divalent radical comprising about 2 to about 20 carbon atoms, wherein said radical contains no isocyanate reactive functional groups;

p represents an integer of 1 to 3;

X is a divalent radical selected from the group consisting of

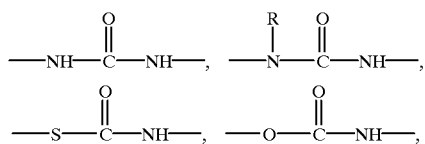

wherein R is independently selected from the group consisting of phenyl, linear aliphatic groups comprising about 1 to about 12 carbon atoms, branched aliphatic groups comprising about 1 to about 12 carbon atoms, and cycloaliphatic groups;

ISO represents a moiety derived from a polyisocyanate component comprising a compound having 2 isocyanate groups and optionally further comprising a compound having greater than 2 isocyanate groups;

Y is a divalent radical selected from the group consisting of

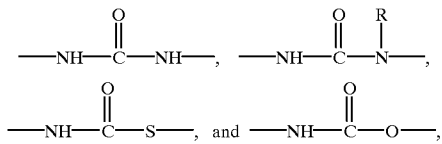

wherein R is as defined above;

POL represents a moiety derived from a polyol component comprising a compound having 2 isocyanate reactive functional groups and optionally a compound having greater than 2 isocyanate reactive functional groups, each isocyanate reactive functional group having at least one active hydrogen;

n represents an integer of about 2 to about 85;

CE represents a moiety derived from a chain extender component comprising a difunctional chain extender having 2 isocyanate reactive functional groups and optionally a polyfunctional chain extender having at least 3 isocyanate reactive functional groups each isocyanate reactive functional group having at least one active hydrogen;

m represents an integer of about 1 to about 84;

WSC represents a moiety derived from a water-solubilizing compound, wherein the water solubilizing compound possesses at least one water solubilizing group and at least two isocyanate reactive functional group, each isocyanate reactive functional group containing at least one active hydrogen wherein the water solubilizing group is reacted with a basic salt forming compound to anionically stabilize the polymer;

q represents an integer of about 2 to about 85;

wherein the urethane branching coefficient of the polymer is about 1.7 to about 2.25; and wherein sufficient polyisocyanate component is included to provide an excess on an isocyanate equivalent basis of about 1.4 to about 4 times the combined active hydrogen equivalent of the isocyanate reactive functional groups of the polyol component, the water solubilizing compound, and the chain extender component.

The symbol "~" represents a chemical bond and indicates that the monomer units c(an be randomly distributed or form blocks.

The invention also relates to protective coatings for wood substrates prepared from the polyurethane dispersions of the present invention. Such wood coatings, particularly for wood furniture, floorings, and marine surfaces, possess superior shelf stability, stain resistance, solvent resistance, durability, toughness over the one-part and two-part waterborne polyurethane coatings currently available. The wood coatings of the present invention also possess unlimited pot-life and are free from the potential toxicity hazard encountered with polyurethane materials which require external crosslinking agents.

The invention also relates to methods of making hydrolyzable and/or hydrolyzed silyl-terminated polyurethanes in aqueous dispersions and the polyurethanes made therefrom.

A first method of making a silyl-terminated polyurethane in an aqueous dispersion comprises the steps of:

(a) reacting a mixture comprising:
  (i) a polyol component comprising a compound having 2 isocyanate reactive functional groups and optionally a compound having greater than 2 isocyanate reactive functional groups, each isocyanate reactive functional group having at least one active hydrogen;
  (ii) a water-solubilizing compound, wherein the water solubilizing compound possesses at least one water solubilizing group and at least one isocyanate reactive functional group, each isocyanate reactive functional group containing at least one active hydrogen; and
  (iii) a polyisocyanate component comprising a compound having 2 isocyanate groups and optionally further comprising a compound having greater than 2 isocyanate groups; wherein sufficient polyisocyanate component is included to provide an excess on an isocyanate equivalent basis of about 1.4 to about 4 times the combined active hydrogen equivalent of the isocyanate reactive functional groups of the polyol component and the water-solubilizing compound;
  (iv) optional polar organic coalescing solvent;
  (v) optional catalyst;
at a sufficient temperature in order to facilitate reaction of the mixture to form an isocyanate-terminated polyurethane prepolymer; wherein the ratio of the isocyanate groups of the polyisocyanate component to the water solubilizing groups of the water solubilizing compound is such that the prepolymer can provide a stable dispersion upon combination with a water phase;

(b) preparing a stable silyl-terminated polyurethane dispersion by combining under sufficient agitation and at a sufficient temperature and pH the isocyanate terminated polyurethane prepolymer prepared according to the step of element (a) with a water phase comprising:
(i) deionized water;
(ii) a chain extender component comprising a difunctional chain extender having 2 isocyanate reactive functional groups and optionally a polyfunctional chain extender having at least 3 isocyanate reactive functional groups, each isocyanate reactive functional group having at least one active hydrogen;
(iii) an isocyanate reactive silane compound having at least one active hydrogen; and
(iv) a salt forming compound selected from the group consisting of basic salt forming compounds and acidic salt forming compounds, wherein the salt forming compound is selected such that the salt forming compound is reactive with the water solubilizing group(s) in the water solubilizing compound; wherein some or all of the salt forming compound is alternatively added to the mixture of step (a) prior to or during reaction, or to the isocyanate terminated polyurethane prepolymer prior to the combination of the isocyanate terminated polyurethane prepolymer with the water phase;

wherein a sufficient amount of the chain extender component and the isocyanate reactive silane is present relative to excess polyisocyanate component such that the active hydrogen to isocyanate group ratio is about 0.85:1 to about 1:1; and wherein the optional polar organic coalescing solvent of element (a) (iv) can optionally be added to the water phase prior to the formation of the dispersion.

A second method of making a hydrolyzable, silyl-terminated polyurethane in an aqueous dispersion comprises the steps of:
(a) reacting a mixture comprising:
(i) a polyol component comprising a compound having 2 isocyanate reactive functional groups and optionally a compound having greater than 2 isocyanate reactive functional groups, each isocyanate reactive functional group having at least one active hydrogen;
(ii) a water-solubilizing compound, wherein the water solubilizing compound possesses at least one water solubilizing group and at least one isocyanate reactive functional group, each isocyanate reactive functional group containing at least one active hydrogen;
(iii) a chain extender component comprising a difunctional chain extender having 2 isocyanate reactive functional groups and optionally a polyfunctional chain extender having at least 3 isocyanate reactive functional groups, each isocyanate reactive functional group having at least one active hydrogen;
(iv) a polyisocyanate component comprising a compound having 2 isocyanate groups and optionally further comprising a compound having greater than 2 isocyanate groups; wherein sufficient polyisocyanate component is included to provide an excess on an isocyanate equivalent basis of about 1.4 to about 4 times the combined active hydrogen equivalent of the isocyanate reactive functional groups of the polyol component, the water solubilizing compound, and the chain extender component;
(v) optional polar organic coalescing solvent; and
(vi) optional catalyst;
at a sufficient temperature in order to facilitate reaction of the mixture of element (a) to form a chain extended isocyanate-terminated polyurethane prepolymer;

wherein the ratio of the isocyanate groups of the polyisocyanate component to the water solubilizing group(s) of the water solubilizing compound is such that the prepolymer can provide a stable dispersion upon combination with a water phase;
(b) preparing a stable silyl-terminated polyurethane dispersion by combining under sufficient agitation and at a sufficient temperature and pH the chain extended isocyanate terminated polyurethane prepolymer of (a) with a water phase comprising:
(i) deionized water;
(ii) an isocyanate reactive silane compound having at least one active hydrogen; and
(iii) a salt forming compound selected from the group consisting of basic salt forming compounds and acidic salt forming compounds, wherein the salt forming compound is selected such that the salt forming compound is reactive with the water solubilizing group(s) in the water solubilizing compound; wherein some or all of the salt forming compound is alternatively added to the mixture of step (a) prior to or during reaction, or to the isocyanate terminated polyurethane prepolymer prior to the combination of the isocyanate terminated polyurethane prepolymer with the water phase;
wherein a sufficient amount of the isocyanate reactive silane is present relative to excess polyisocyanate component such that the active hydrogen to isocyanate group ratio is about 0.85:1 to about 1:1; and wherein the optional polar organic coalescing solvent of element (a)(v) can optionally be added to the water phase prior to the formation of the dispersion.

A third method of making a hydrolyzable, silyl-terminated polyurethane in an aqueous dispersion comprises the steps of:
(a) reacting a mixture comprising:
(i) a polyol component comprising a compound having 2 isocyanate reactive functional groups and optionally a compound having greater than 2 isocyanate reactive functional groups, each isocyanate reactive functional group having at least one active hydrogen;
(ii) a water-solubilizing compound, wherein the water solubilizing compound possesses at least one water solubilizing group and at least one isocyanate reactive functional group, each isocyanate reactive functional group containing at least one active hydrogen;
(iii) a chain extender component comprising a difunctional chain extender having 2 isocyanate reactive functional groups and optionally a polyfunctional chain extender having at least 3 isocyanate reactive functional groups, each isocyanate reactive functional group having at least one active hydrogen; and
(iv) a polyisocyanate component comprising a compound having 2 isocyanate groups and optionally further comprising a polyisocyanate having at least 3 isocyanate groups;
(v) optional polar organic coalescing solvent; and
(vi) optional catalyst;
at a sufficient temperature in order to facilitate reaction of the mixture to form a chain extended isocyanate-terminated polyurethane prepolymer; wherein the ratio of the isocyanate groups of the polyisocyanate component to the water solubilizing groups of the water solubilizing component is such that the prepolymer can provide a stable dispersion upon combination with a water phase;
(b) when the reaction of the mixture of element (a) is about 80 to about 90% complete, adding to the mixture of element (a) a polyisocyanate adduct having greater than 2 isocyanate groups to form a branched chain extended isocyanate terminated polyurethane prepolymer; wherein sufficient polyisocyanate component and polyisocyanate adduct is included to provide an excess on an isocyanate equivalent basis of about 1.4 to about 4 times the combined active hydrogen equivalent of the isocyanate reactive functional groups of the polyol component, the water-solubilizing compound, and the chain extender component;

(c) preparing a stable silyl-terminated polyurethane dispersion by combining under sufficient agitation and at a sufficient temperature and pH the branched chain-extended isocyanate-terminated polyurethane prepolymer of (b) with a water phase comprising:
  (i) deionized water;
  (ii) an isocyanate reactive silane compound having at least one active hydrogen;
  (iii) a chain extender component comprising a difunctional chain extender having 2 isocyanate reactive functional groups and optionally a polyfunctional chain extender having at least 3 isocyanate reactive functional groups, each isocyanate reactive functional group having at least one active hydrogen; and
  (iv) a salt forming compound selected from the group consisting of basic salt forming compounds and acidic salt forming compounds, wherein the salt forming compound is selected such that the salt forming compound is reactive with the water solubilizing group(s) in the water solubilizing compound wherein some or all of the salt forming compound is alternatively added to the mixture of step (a) or the mixture of step (b) prior to combination of the branched chain-extended isocyanate-terminated polyurethane prepolymer with the water phase;

wherein a sufficient amount of the isocyanate reactive silane is present relative to excess polyisocyanate such that the active hydrogen to isocyanate group ratio is about 0.85:1 to about 1:1; wherein (a)(v) can optionally be added to the water phase prior the formation of the dispersion.

A fourth method of making a hydrolyzable, silyl-terminated polyurethanes in an aqueous dispersion comprising the steps of:
  (a) reacting a mixture comprising
    (i) a polyol component comprising a compound having 2 isocyanate reactive functional groups and optionally a compound having greater than 2 isocyanate reactive functional groups, each isocyanate reactive functional group having at least one active hydrogen;
    (ii) a water-solubilizing compound, wherein the water solubilizing compound possesses at least one water solubilizing group and at least one isocyanate reactive functional group, each isocyanate reactive functional group containing at least one active hydrogen;
    (iii) a chain extender component comprising a difunctional chain extender having 2 isocyanate reactive functional groups and optionally a polyfunctional chain extender having at least 3 isocyanate reactive functional groups, each isocyanate reactive functional group having at least one active hydrogen;
    (iv) a polyisocyanate component comprising a compound having 2 isocyanate groups and optionally further comprising a compound having greater than 2 isocyanate groups wherein sufficient polyisocyanate component is included to provide an excess on an isocyanate equivalent basis of about 1.4 to about 4 times the combined active hydrogen equivalent of the isocyanate reactive functional groups of the polyol component, the water solubilizing compound, and the chain extender component;
    (v) optional polar organic coalescing solvent; and
    (vi) optional catalyst;
  at a sufficient temperature in order to facilitate reaction of the mixture to form a chain-extended isocyanate-terminated polyurethane prepolymer,
  (b) reacting at least a stoichiometrically equivalent amount of an isocyanate blocking agent with the reaction product of (a) comprising chain extended isocyanate-terminated polyurethane prepolymer to form a blocked chain extended isocyanate-terminated polyurethane prepolymer; wherein the ratio of the isocyanate groups of the polyisocyanate component to the water solubilizing groups of the water solubilizing component is such that the prepolymer can provide a stable dispersion upon combination with a water phase;
  (c) preparing a stable silyl-terminated polyurethane dispersion by displacing the isocyanate blocking agent on the blocked chain extended isocyanate-terminated polyurethane prepolymer of (b) by reacting under sufficient agitation and at a sufficient temperature and pH the blocked chain extended isocyanate terminated polyurethane prepolymer of (b) with a water phase comprising:
    (i) deionized water;
    (ii) an isocyanate reactive silane compound having at least one active hydrogen; and
    (iii) a salt forming compound selected from the group consisting of basic salt forming compounds and acidic salt forming compounds, wherein the salt forming compound is selected such that the salt forming compound is reactive with the water solubilizing group in the water solubilizing compound which is reacted into the the chain extended polyurethane prepolymer of (a), wherein some or all of the salt forming compound is alternatively added to the mixture of step (a) or the mixture of step (b) prior to combination of the blocked chain extended isocyanate terminated polyurethane prepolymer with the water phase;

wherein a sufficient amount of the isocyanate reactive silane is present relative to excess polyisocyanate component such that the active hydrogen to isocyanate group ratio is about 0.85:1 to about 1:1; and wherein the optional polar organic coalescing solvent of element (a)(v) can optionally be added to the water phase prior the formation of the dispersion.

A fifth method of making a hydrolyzable, silyl-terminated polyurethanes in an aqueous dispersion comprises the steps of:
  (a) reacting a mixture comprising:
    (i) a polyol component comprising a compound having 2 isocyanate reactive functional groups and optionally a compound having greater than 2 isocyanate reactive functional groups, each isocyanate reactive functional group having at least one active hydrogen;
    (ii) a water-solubilizing compound, wherein the water solubilizing compound possesses at least one water solubilizing group and at least one isocyanate reactive functional group, each isocyanate reactive functional group containing at least one active hydrogen; and
    (iii) a chain extender component comprising a difunctional chain extender having 2 isocyanate reactive functional groups and optionally a polyfunctional chain extender having at least 3 isocyanate reactive functional groups, each isocyanate reactive functional group having at least one active hydrogen;
(iv) a polyisocyanate component comprising a compound having 2 isocyanate groups and optionally further comprising a compound having greater than 2 isocyanate groups wherein sufficient polyisocyanate component is included to provide an excess on an isocyanate equivalent basis of about 1.4 to about 4 times the combined active hydrogen equivalent of the isocyanate reactive functional groups of the polyol component, the water solubilizing compound, and the chain extender component;
(v) optional polar organic coalescing solvent; and
(vi) optional catalyst;

at a sufficient temperature in order to facilitate reaction of the mixture to form a chain-extended isocyanate-terminated polyurethane prepolymer, wherein the ratio of the isocyanate groups of the polyisocyanate component to the water solubilizing groups of the water solubilizing component is such that the prepolymer can provide a stable dispersion upon combination with a water phase;

(b) reacting the chain extended isocyanate-terminated polyurethane prepolymer of element (a) with an isocyanate-reactive silane compound having at least one active hydrogen to produce a silyl-terminated chain-extended polyurethane prepolymer;

wherein a sufficient amount of the isocyanate reactive silane compound is present relative to excess polyisocyanate component such that the active hydrogen to isocyanate group ratio is about 0.85:1 to about 1:1;

(c) preparing a stable silyl-terminated polyurethane dispersion by combining under sufficient agitation and at a sufficient temperature and pH the silyl-terminated chain extended isocyanate terminated polyurethane prepolymer of (b) with a water phase comprising:
(i) deionized water;
(ii) a salt forming compound selected from the group consisting of basic salt forming compounds and acidic salt forming compounds, wherein the salt forming compound is selected such that the salt forming compound is reactive with the water solubilizing group in the water solubilizing compound which is reacted into the chain-extended isocyanate terminated polyurethane prepolymer; wherein some or all of the salt forming compound is alternatively added to the mixture of step (a) or the mixture of step (b) prior to combination of the silyl-terminated chain-extended polyurethane prepolymer with the water phase; wherein the optional polar organic coalescing solvent of element (a)(v) can optionally be added to the water phase prior the formation of the dispersion.

A sixth method of making a hydrolyzable, silyl-terminated polyurethane in an aqueous dispersion comprises the steps of:

(a) reacting a mixture comprising:
(i) a polyol component comprising a compound having 2 isocyanate reactive functional groups and optionally a compound having greater than 2 isocyanate reactive functional groups, each isocyanate reactive functional group having at least one active hydrogen;
(ii) a water-solubilizing compound, wherein the water solubilizing compound possesses at least one water solubilizing group and at least one isocyanate reactive functional group, each isocyanate reactive functional group containing at least one active hydrogen;
(iii) a chain extender component comprising a difunctional chain extender having 2 isocyanate reactive functional groups and optionally a polyfunctional chain extender having at least 3 isocyanate reactive functional groups, each isocyanate reactive functional group having at least one active hydrogen;
(iv) a polyisocyanate component comprising a compound having 2 isocyanate groups and optionally further comprising a compound having greater than 2 isocyanate groups wherein sufficient polyisocyanate component is included to provide an excess on an isocyanate equivalent basis of about 1.4 to about 4 times the combined active hydrogen equivalent of the isocyanate reactive functional groups of the polyol component, the water solubilizing compound, and the chain extender component;
(v) optional polar organic coalescing solvent; and
(vi) optional catalyst;

at a sufficient temperature in order to facilitate reaction of the mixture to form a chain-extended isocyanate terminated polyurethane prepolymer, wherein the ratio of the isocyanate groups of the polyisocyanate component to the water solubilizing groups of the water solubilizing component is such that the prepolymer can provide a stable dispersion upon combination with a water phase;

(b) preparing a stable silyl-terminated polyurethane dispersion by combining under sufficient agitation and at a sufficient temperature and pH the chain extended isocyanate terminated polyurethane prepolymer of (a) with a water phase comprising:
(i) deionized water;
(ii) a chain extender component comprising a difunctional chain extender having 2 isocyanate reactive functional groups and optionally a polyfunctional chain extender having at least 3 isocyanate reactive functional groups, each isocyanate reactive functional group having at least one active hydrogen;
(iii) an isocyanate reactive silane compound having at least one active hydrogen; and
(iv) a salt forming compound selected from the group consisting of basic salt forming compounds and acidic salt forming compounds, wherein the salt forming compound is selected such that the salt forming compound is reactive with the water solubilizing group(s) in the water solubilizing compound, wherein some or all of the salt forming compound is alternatively added to the mixture of step (a) prior to combination of the chain extended isocyanate terminated polyurethane prepolymer with the water phase;

wherein a sufficient amount of the chain extender component and the isocyanate reactive silane compound is present relative to excess polyisocyanate component such that the active hydrogen to isocyanate group ratio is about 0.85:1 to about 1:1; wherein (a)(v) can optionally be added to the water phase prior to the formation of the dispersion.

DETAILED DESCRIPTION OF THE INVENTION

The externally chain-extended silyl-terminated polyurethanes contained in the dispersions of the invention are composed of several moieties. Urethane moieties, optional urea moieties, and optional thiocarbamate moieties link together generally divalent polyisocyanate-derived moieties, polyol-derived moieties, chain extender-derived moieties, and solubilizing moieties in the chain along with monovalent terminal silyl moieties. Polyisocyanate-derived moieties are the radicals derived from polyisocyanates having at least two isocyanate functional groups and polyisocyanate adducts having at least two isocyanate functional groups by the reaction of the isocyanate groups. Polyol-derived moieties are the radicals formed by reaction of isocyanate-reactive functional groups on the polyols. Similarly, chain extender-derived moieties are the radicals derived from poly(active hydrogen), isocyanate-reactive organic compounds (e.g., polyols, polyamines and polythiols). Water-solubilizing ionic compounds and silyl compounds yield solubilizing moieties and silyl moieties by elimination of isocyanate-reactive groups. The polyurethane molecule as a whole is thus made up of recurring polyisocyanate-derived moieties, polyol-derived moieties, chain extender derived moieties, and interspersed solubilizing moieties, generally terminated by silyl moieties. To some extent, of course, two or more molecules in aqueous dispersion may be connected by siloxane linkages.

In general, the silane-terminated polyurethane dispersions are prepared by first forming a polyurethane prepolymer by combining a polyisocyanate component with isocyanate reactive compounds. This prepolymer is then dispersed in a water phase which typically provides chain extension and silane termination of the polyurethane prepolymer. A summary of basic polyurethane chemistry and technology which explains and summarizes these reactions and processes can be found, for example, in *Polyurethanes: Chemistry and Technology*, Saunders and Frisch, Interscience Publishers (New York, 1963 (Part I) and 1964 (Part II)).

The polyurethane prepolymers useful in the present invention can be prepared by reacting an excess of a polyisocyanate component on an isocyanate equivalent basis with one or more polyols and at least one isocyanate-reactive water-solubilizing compound in the presence of an optional catalyst and/or a coalescing solvent. One or more additional optional components, such as chain extenders, blocking agents and isocyanate-reactive silane compounds, may be included in the polyurethane prepolymer. For example, isocyanate-terminated polyurethane prepolymers may be modified to include a chain extender to form a chain extended isocyanate-terminated polyurethane prepolymer, a blocking agent to form a blocked isocyanate terminated polyurethane prepolymer, a polyfunctional chain extender or polyisocyanate adduct to form a branched isocyanate terminated polyurethane prepolymer, and/or an isocyanate-reactive silane compound to form a silane-terminated polyurethane prepolymer.

In various instances multifunctional components with functionality greater than two may be incorporated into the urethane dispersion in limited amounts. Examples of these materials are: multifunctional polyols (e.g., TONE™ 0305, a trifunctional polyol available from Union Carbide), polyisocyanates with functionality greater than two (e.g., DES-MODUR™ N-100, the biuret of hexamethylene diisocyanate available from Miles Coating Division, a trifunctional isocyanate adduct such as Cythane™ 3160 based on TMXDI available from American Cyanamid), and multifunctional chain extenders, (e.g., trimethylolpropane). The introduction of multifunctional components may provide advantages to a coating made from the finished dispersion such as improved solvent resistance. The multifunctionality may cause a reduction in freeze-thaw stability when incorporated in modestly high amounts. Generally if too much multifunctionality is introduced, it may be difficult or impossible to make a dispersion without some coagulation occurring.

The "urethane branching coefficient" (U.B.C.) is a calculation used to express total the amount of branching provided by multifunctional polyisocyanates, polyols and chain extenders in the urethane portion of the silane-terminated urethane dispersion, i.e., it excludes the silane linkage(s) (Si—O—Si) and (Si—OH) but will include other active hydrogen groups of the silane such as amine, mercaptan, etc. The calculation assumes unreacted isocyanate reacts with water. Aminopropyltriethoxysilane, for example would have a branching coefficient (B.C.) of 1. Similarly, diols and diisocyanates would each have a branching coefficient of 2, triols and triisocyanates would each have a branching coefficient of 3, etc. The urethane branching coefficient of a silane-terminated urethane made with 1 mole of aminopropyltriethoxysilane, 1 mole of a diol, 2 moles of difunctional chain extender, 1 mole of triol, and 5 moles of a diisocyanate would be calculated in this manner:

| MATERIAL | B.C. | MOLES | MOLE % | MOLE % B.C. |
|---|---|---|---|---|
| Aminopropyltriethoxysilane | 1 | 1 | 0.1 | 0.1 |
| Diol | 2 | 1 | 0.1 | 0.2 |
| Difunctional Chain Extender | 2 | 2 | 0.2 | 0.4 |
| Triol | 3 | 1 | 0.1 | 0.3 |
| Diisocyanate | 2 | 5 | 0.5 | 1.0 |
| URETHANE BRANCHING COEFFICIENT = | | | | 2.0 |

Using this measurement, the amount of branching in the silane-terminated polyurethane dispersions of the present invention (the U.B.C.) typically ranges from about 1.7 to about 2.25, preferably from about 1.85 to about 2.01.

It is important that the prepolymer prepared contain more than one isocyanate radical in the reaction mixture for each active hydrogen radical contributed by the polyol component, the water solubilizing compound, and other isocyanate reactive compounds in the prepolymer. "Active hydrogens" are those nucleophilic hydrogen atoms which conform to the Zerewitinoff determination of hydrogen atoms; i.e., compounds which, when reacted with a solution of methylmagnesium iodide in purified n-butyl ether, produce methane. Typically, isocyanate reactive groups having at least one active hydrogen include but are not limited to those selected from the group consisting of —OH, $NH_2$, —SH, and —NHR, wherein R is selected from the group consisting of phenyl, straight or branched aliphatic groups comprising from about 1 to about 12 carbon atoms, and cycloaliphatic groups. Isocyanate equivalent to active hydrogen equivalent ratios of about 1.4:1 to about 4:1 are suitable in the polyurethane prepolymers. Ratios of less than about 1.4:1 tend to produce films formed from the polyurethane dispersions of the present invention which can have low cohesive strength and are softer than desirable for most applications. Ratios higher than about 4:1 provide a high combined chain extender/isocyanate-reactive silane content when these components are added in the water phase of the polyurethane dispersion. As a result, the final coatings tend to be hard and stiff.

This required excess of isocyanate present in the prepolymer is then consumed by condensation with the active-hydrogen containing isocyanate reactive compounds in the water phase when the polyurethane prepolymer is dispersed.

If an external chain extender is introduced in the water phase and little or no chain extension due to water is desired, then the active-hydrogens contributed by either difunctional or polyfunctional chain extenders typically represent on an equivalent basis from about 65 to about 95% on an equivalent basis of the excess of isocyanate, while the isocyanate-reactive silane compound is present in the amount of about 5% to about 30% of the excess isocyanate. If no chain extender is incorporated in the water phase of the dispersion, then theoretically 100% of the remaining isocyanate groups react with the active hydrogens found in the isocyanate reactive silane compounds. However, if a minor degree of chain extension due to water is desired, then from about 85 to about 100 percent, preferably about 95 to about 100 percent, of the isocyanate excess can be reacted with the active hydrogens supplied by the chain extenders and isocyanate reactive compounds. In this situation, the remainder of the isocyanate excess can form urea linkages with other prepolymers by a well-known secondary reaction, first reacting with water to form a carbamic acid which then converts to a primary amine and carbon dioxide. This primary amine then forms a urea linkage with any available isocyanate group in the dispersion.

The dispersions of the invention form useful and processible coatings at solids content ranging from about 3 to about 45% by weight solids, generally from about 3 to about 40% by weight solids.

Polyisocyanates

The polyisocyanate component must comprise a compound having two isocyanate groups (i.e., diisocyanates and/or adducts thereof) and may optionally comprise compounds having greater than 2 isocyanate groups (e.g., triisocyanates and/or adducts thereof). Adducts of the polyisocyanate compounds as defined herein refer to isocyanate functional derivatives of polyisocyanate compounds and polyisocyanate prepolymers. Examples of adducts include but are not limited to those selected from the group consisting of ureas, biurets, allophanates, dimers and trimers of isocyanate compounds, uretonimediones, and mixtures thereof. Any suitable organic polyisocyanate, such as an aliphatic, cycloaliphatic, araliphatic or aromatic polyisocyanate, may be used either singly or in mixtures of two or more. The aliphatic isocyanates provide generally better light stability than the aromatic compounds. Aromatic polyisocyanates, on the other hand, are generally more economical and reactive toward polyols and other poly (active hydrogen) compounds than aliphatic polyisocyanates. Suitable aromatic polyisocyanates include but are not limited to those selected from the group consisting of 2,4-toluene diisocyanate, 2,6-toluene diisocyanate, a dimer of toluene diisocyanate (available under the trademark Desmodur™ TT from Miles Coating Division), diphenylmethane 4,4'-diisocyanate (MDI), 1,5-diisocyanatonaphthalene, 1,4-phenylene diisocyanate, 1,3-phenylene diisocyanate, and mixtures thereof. Examples of useful cycloaliphatic polyisocyanates include but are not limited to those selected from the group consisting of dicyclohexylmethane diisocyanate ($H_{12}$MDI, commercially available as Desmodur™W from Miles Coating Division), isophorone diisocyanate (IPDI), 1,4-cyclohexane diisocyanate (CHDI), 1,4-cyclohexanebis(methylene isocyanate) (BDI), 1,3-bis (isocyanatomethyl)cyclohexane ($H_6$XDI), and mixtures thereof. Examples of useful aliphatic polyisocyanates include but are not limited to those selected from the group consisting of hexamethylene 1,6-diisocyanate (HDI), 1,12-dodecane diisocyanate, 2,2,4-trimethyl-hexamethylene diisocyanate (TMDI), 2,4,4-trimethyl-hexamethylene diisocyanate (TMDI), 2-methyl-1,5-pentamethylene diisocyanate, dimer diisocyanate, the urea of hexamethyl diisocyanate, and mixtures thereof. Examples of useful araliphatic polyisocyanates include but are not limited to those selected from the group consisting of m-tetramethyl xylylene diisocyanate (m-TMXDI), p-tetramethyl xylylene diisocyanate (p-TMXDI), 1,4-xylylene diisocyanate (XDI), 1,3-xylylene diisocyanate, and mixtures thereof. Preferred polyisocyanates, in general, include those selected from the group consisting of isophorone diisocyanate, toluene diisocyanate, dicyclohexylmethane 4,4'-diisocyanate, MDI, derivatives of all the aforementioned, and mixtures thereof.

Polyisocyanates or polyisocyanate adducts containing more than two isocyanate groups in the molecule can be included to introduce branching into the prepolymer which enhances the solvent resistance, water resistance and hardness of coatings made from these polyurethane dispersions; however, a predominance of diisocyanates is required. Limited amounts of polyisocyanates containing greater than 2 isocyanate groups can be employed subject to the urethane branching coefficient calculation discussed previously. Typical isocyanates from this group include but are not limited to those selected from the group consisting of triphenylmethane 4,4',4"-triisocyanate, tris-(4-isocyanatophenyl)-thiophosphate, and the like. Similarly, limited amounts of polyisocyanate adducts containing more than two isocyanate groups can be employed subject to the urethane branching coefficient calculation discussed previously including but not limited to those selected from the group consisting of trimer of isophorone diisocyanate (Polyisocyanate IPDI-T 1890, commercially available from Hüls America), trimer of HDI (commercially available as Desmodur™N3300 from Miles Polymer Division), trimer of m-tetramethylxylene diisocyanate (a trifunctional polyisocyanate adduct of trimethylolpropane and m-tetramethylxylene diisocyanate available as Cythane™ 3160 from American Cyanamid Co.).

The isocyanate-derived moiety of the polyurethane is thus a polyvalent organic radical of from about 2 to about 40 carbon atoms free from isocyanate-reactive or hydroxyl-reactive groups, e.g., —OH, —SH, —$NH_2$, —NHR, —$CO_2$H, —COCl, —$SO_3$H, —$SO_2$Cl, etc., wherein R is selected from the group consisting of phenyl, straight or branched aliphatic groups comprising from about 1 to about 12 carbon atoms, and cycloaliphatic groups. Preferably, R is a lower alkyl group comprising 1 to 4 carbon atoms.

In addition, blocked polyisocyanates made from the above can be used. A blocked polyisocyanate can be prepared by reacting one of the above polyisocyanates with a blocking agent. Typical isocyanate blocking agents include but are not limited to those selected from the group consisting of phenol, nonyl phenol, methylethyl ketoxime, sodium bisulfate, and e-caprolactam. These blocked prepolymers can be used in conjunction with diamines or diamine precursors such as ketamines.

Polyols

The polyol component comprises a compound having 2 isocyanate reactive functional groups (diols and derivatives thereof) and optionally further comprises a compound having greater than 2 isocyanate reactive groups (triols, tetrols, etc. and/or derivative thereof), each isocyanate reactive group having at least one active hydrogen.

Illustrative polyols include the following classes of compounds:
 (i) the polyester polyols, including lactone polyols and the alkylene oxide adducts thereof;
 (ii) the polyether polyols, including polyoxyalkylene polyols, polyoxycycloalkylene polyols, polythioethers, and alkylene oxide adducts thereof; and (iii) specialty polyols including but not limited to those selected from the group consisting of polybutadiene polyols, hydrogenated polybutadiene polyols polycarbonate polyols, hydroxy alkyl derivatives of bisphenol A such as bis(2-hydroxyethyl) bisphenol A, polythioether polyols, fluorinated polyether polyols, amine-terminated polyether polyols, amine terminated polyester polyols, and acrylic polyols.

The term "alkylene oxide" includes, for example, ethylene oxide, 1,2-epoxypropane, 1,2-epoxybutane, 2,3-epoxybutane, isobutylene oxide, epichlorohydrin, mixtures thereof, and the like.

Preferred polyols are the polyester polyols and polyoxyalkylene polyols.

Polyester polyols are esterification products which range from liquids to non-crosslinked solids, i.e., solids which are soluble in many of the more common inert normally liquid organic media, and which are prepared by the reaction of polycarboxylic acids, their anhydrides, their esters or their halides, with a stoichiometric excess of a polyol. Preferred examples of polycarboxylic acids which can be employed to prepare the polyester polyols include dicarboxylic acids and tricarboxylic acids, such as maleic acid, succinic acid, glutaric acid, adipic acid, pimelic acid, suberic acid, azelaic acid, sebacic acid, chlorendic acid, 1,2,4-butanetricarboxylic acid, phthalic acid, terephthalic acid, and the like. The esterification reaction followed in preparing polyester polyols from polyfunctional acids and polyols is well known in the art. Examples of specific useful polyester polyols include but are not limited to those selected from the group consisting of polyglycol adipates, polyethylene terephthalate polyols, polycaprolactone polyols.

Lactone polyols are known in the art and may be prepared, for example, by reacting a lactone such as epsilon-caprolactone or a mixture of epsilon-caprolactone and an alkylene oxide with a polyfunctional initiator such as polyhydric alcohol. The term "lactone polyols" also includes the various "copolymers" such as lactone copolyesters, lactone polyester/polycarbonates, lactone polyester/polyethers, lactone polyester/polyether/polycarbonates, and the like.

Polyether polyols include polyoxyalkylene polyols including alkylene oxide adducts of, for example, water, ethylene glycol, diethylene glycol, propylene glycol, butylene glycol, dipropylene glycol, glycerol, polycaprolactone triols, tetra substituted hydroxypropyl ethylene diamine available under the tradename Quadrol™ from BASF and the like. The alkylene oxides employed in producing polyoxyalkylene polyols normally comprise from 2 to 4 carbon atoms. Grafted polyether polyols such as styrene/acrylonitrile grafted polyether polyols and Polyharnstoff dispersion polyurea polyols, are also examples of useful polyether polyols. Polyethylene oxide, propylene oxide and mixtures thereof are preferred. Such polyalkylene polyols are well known in the art.

Another useful class of polyether polyols is the polyoxytetramethylene glycols, which may be prepared, for example, by polymerizing tetrahydrofuran in the presence of acidic catalyst. Random copolymers of poly(tetramethylene oxide)/poly(ethylene oxide), such as those available under the trademark PolyTHF™ ER1250 (commercially available from BASF), are also useful polyether polyols. Examples of useful specific polyether polyols include but are not limited to those selected from the group consisting of poly(oxypropylene) glycols, ethylene oxide (eo) capped poly(oxypropylene) glycol, ,ω-diamino poly(oxypropylene), aromatic amine-terminated poly(oxypropylene), graft-polyether polyols, poly(oxyethylene) polyols, α,ω-diamino poly(oxytetramethylene), polybutylene oxide polyols, poly(butylene oxide-ethylene oxide) random copolymers, and mixtures thereof.

Other variants, adducts, and derivatives of polyether polyols, are useful including but not limited to those selected from the group consisting of amine-terminated polyoxyalkylene and polyoxymethylene compounds such as αω-diamino poly(oxypropylene) glycol, POLAMINE™ (an aromatic amine-terminated poly(oxytetramethylene) commercially available from Air Products Co.), polythioether polyols such as LP series of materials commercially available from Morton-Thiokol Co., fluorinated polyether polyols, and mixtures thereof.

The molecular weight of the polyol component is one significant factor in determining the final properties of the polyurethane; generally, the higher the molecular weight of the polyol component, the softer the resulting polyurethane. The term "molecular weight" is used herein to refer to the polyurethane. The term "molecular weight" is used herein to refer to the number average molecular weight ($\overline{M}_n$). Polyols of molecular weight as low as 250 and as high as about 35,000 produce useful products, molecular weight ranges of about 500 to about 3000 being preferred and most readily commercially available.

The polyol-derived moiety of the polyurethane is thus a polyvalent organic radical of from about 10 to about 1000 carbon atoms free from isocyanate-reactive or hydroxyl reactive groups.

Water-Solubilizing Compounds

Another component used in preparing the isocyanate terminated prepolymer is a water-solubilizing compound. The water solubilizing compound possesses at least one water solubilizing group and at least one isocyanate reactive functional group, each isocyanate reactive functional group containing at least one active hydrogen. Preferably, each compound has two isocyanate reactive groups which are connected through an organic radical to each other and to a water-solubilizing group. Suitable water-solubilizing groups, such as carboxyl, sulfate, sulfonate, phosphate, ammonium, including quaternary ammonium, and the like, are those which ionize in water when combined with a corresponding salt-forming compound. Preferred isocyanate-reactive hydrogen atoms are those which react readily with an isocyanate group at or below about 75° C. such as the hydrogen atoms of aliphatic hydroxyl, aliphatic mercapto, aliphatic amino, and aromatic amino groups and are not those hydrogens present in the water solubilizing group which could be considered active hydrogens under certain circumstances. Hydrogen atoms which react slowly, such as the "acidic" hydrogen atoms in amido groups, and sterically hindered or very slow reacting acidic hydrogen atoms such as the carboxylic acid group of dimethylpropionic acid are not included.

A suitable water-solubilizing compound is represented by the formula $(HB)_2R^1A$ in which $R^1A$ is a water-solubilizing moiety; B is selected from the group consisting of O, S, NH, and NR; $R^1$ represents a trivalent organic linking group comprising about 2 to about 25 carbon atoms which may include tertiary nitrogen or ether oxygen atoms and is free from isocyanate-reactive hydrogen containing groups; A is a water solubilizing ionic group such as those selected from the group consisting of $—SO_3M$, $—OSO_3M$, $—CO_2M$, $—PO(OM)_3$, $—NR_2.HX$, and $—NR_3X$, wherein M is H or one equivalent of a monovalent or divalent soluble cation such as sodium, potassium, calcium, and $NR_3H^+$, wherein X is a soluble anion such as those selected from the group consisting of halide, hydroxide, and deprotonated carboxylic acid, and R is selected from the group consisting of a phenyl group, cycloaliphatic group, or a straight or branched aliphatic group having from about 1 to about 12 carbon atoms. Preferably, R is a lower alkyl group comprising 1 to 4 carbon atoms. The group —$NR_3X$ represents a quaternary ammonium substituent which is a salt of water soluble acid, such as trimethyl ammonium chloride, pyridinium sulfate, etc. or ammonium substituent and the group —$NR_2.HX$ which is salt of a water soluble acid, such as dimethyl ammonium acetate or propionate. A representative suitable solubilizing molecule would be αα-bis(hydroxymethyl) propionic acid ammonium salt. The amount of water-solubilizing group provided should be sufficient to self-emulsify the prepolymer, typically in the range of isocyanate-to-solubilizing group ratio of from about 4:1 to about 16:1, preferably at a proportion of from about 5:1 to about 11:1.

Illustrative solubilizing compounds include but are not limited to those selected from the group consisting of:

[$H_2N(CH_2)_nCH_2$]$_2NCH_3$ wherein n is an integer of 1 to 3;
(HOCH$_2$)$_2$C(CH$_3$)COOH;
[HO(CH$_2$)$_n$CH$_2$]$_2$NCH$_3$ wherein n is an integer of 1 to 3;
H$_2$N—C$_2$H$_4$—NH—C$_2$H$_4$—SO$_3$H;
H$_2$N—C$_3$H$_6$—N(CH$_3$)—C$_3$H$_6$—SO$_3$H;

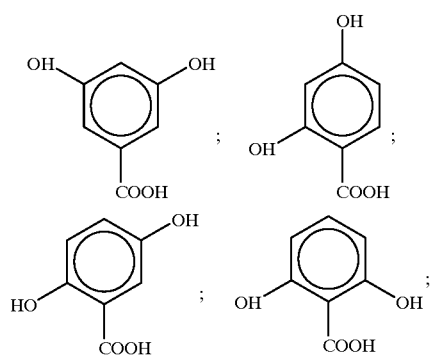

HOCH$_2$—CH(OH)—CO$_2$Na;
[(HOCH$_2$)$_2$CHCH$_2$—COO]$^-$[NH(CH$_3$)$_3$]$^+$;
CH$_3$(CH$_2$)$_2$CH(OH)—CH(OH)(CH$_2$)$_3$CO$_2$K;
(HOC$_2$H$_4$)$_2$N—C$_3$H$_6$—OSO$_3$Na;

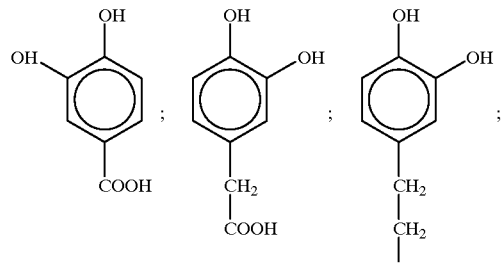

[H$_2$N—C$_2$H$_4$—NH—C$_2$H$_4$—N(CH$_3$)$_3$]$^+$ Cl$^-$;

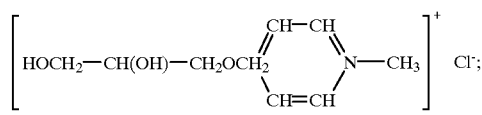

(HOCH$_2$CH$_2$)$_2$NC$_6$H$_4$OCH$_2$CH$_2$OSO$_2$OH;
[(H$_2$N)$_2$C$_6$H$_3$SO$_3$]$^-$[NH(C$_2$H$_5$)$_3$]$^+$; and mixtures thereof.

Isocyanate-Reactive Silane Compounds

In addition to the isocyanate-terminated polyurethane prepolymer discussed supra, isocyanate-reactive silane compounds are useful in forming the dispersion of the invention. Silane compounds containing one, two, or three hydrolyzable groups on the silicon and one organic group including an isocyanate-reactive radical are most suitable for forming the terminal groups. As has been pointed out above any of the conventional hydrolyzable groups, such as those selected from the group consisting of hydrogen, alkoxy, acyloxy, halogen, amino, oxime, and the like, can be used. The hydrogen halide liberated from halogen-containing silanes may be disadvantageous when cellulose substrates are used and amino containing silazines are relatively unstable and difficult to handle. The alkoxy group is the most preferred hydrolyzable group and particularly preferred compounds are those of the structure ($R^3O$)$_3$Si$R^4$—Z, wherein ($R^3O$)$_3$Si$R^4$— is a silyl moiety, $R^3$ is selected from the group consisting of hydrogen, lower alkyl radicals of one to four carbon atoms, preferably one or two (i.e., methoxy, ethoxy); lower acyl groups of about 2 to about 5 carbon atoms, preferably 2 or 3 (i.e., acetyl or propionyl), and lower oxime groups of the formula —N=CR$^5$R$^6$, wherein $R^5$ and $R^6$ are monovalent lower alkyl groups comprising about 1 to about 12 carbon atoms, which can be the same or different, preferably selected from the group consisting of methyl, ethyl, propyl, and butyl; $R^4$ is a divalent organic bridging radical of about 2 to about 20 carbon atoms free from isocyanate reactive groups, preferably about 3 to about 10 carbon atoms, selected from the group consisting of divalent hydrocarbyl radicals free from olefinic unsaturation and free from isocyanate-reactive groups, and divalent polyoxyalkylene mono- or poly-oxaalkylene radicals containing not more than one ether oxygen per two carbon atoms; and Z is an isocyanate reactive group such as those selected from the group consisting of —OH, —SH, —NHR, —NH$_2$, —N(C$_2$H$_4$OH)$_2$, and other active hydrogen terminated compounds, wherein R is selected from the group consisting of phenyl, straight or branched aliphatic groups comprising from about 1 to about 12 carbon atoms, and cycloaliphatic groups.

Representative divalent alkylene radicals (i.e., $R^4$) include but are not limited to those selected from the group consisting of —CH$_2$CH$_2$—, —CH$_2$CH$_2$CH$_2$—, —CH$_2$CH$_2$CH$_2$OCH$_2$CH$_2$—, and —CH$_2$CH$_2$C$_6$H$_4$CH$_2$CH$_2$—. Other preferred compounds are those which contain one or two hydrolyzable groups, such as those having the structures

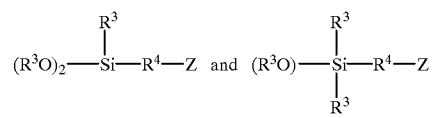

wherein $R^3$ and $R^4$ are as previously defined.

Following the hydrolysis of some of these terminal silyl groups, the polymers are curable by mutual interreaction to form siloxane linkages, e.g.,

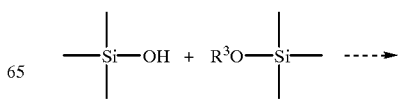

-continued

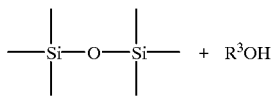

Such silicon compounds are well known in the art and many are commercially available or are readily prepared. Representative isocyanate-reactive silanes include but are not limited to those selected from the group consisting of:

$H_2NCH_2CH_2CH_2Si(OC_2H_5)_3$;

$H_2NCH_2CH_2CH_2Si(OCH_3)_3$;

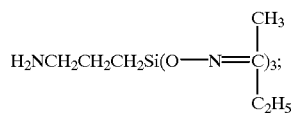

$HSCH_2CH_2CH_2Si(OCH_3)_3$;
$HO(C_2H_4O)_3C_2H_4N(CH_3)(CH_2)_3Si(OC_4H_9)_3$;
$H_2NCH_2C_6H_4CH_2CH_2Si(OCH_3)_3$;
$HSCH_2CH_2CH_2Si(OCOCH_3)_3$;
$HN(CH_3)CH_2CH_2Si(OCH_3)_3$;
$HSCH_2CH_2CH_2SiCH_3(OCH_3)_2$;
$(H_3CO)_3SiCH_2CH_2CH_2NHCH_2CH_2CH_2Si(OCH_3)_3$;
and mixtures thereof.

Salt-Forming Compounds

When acidic functional water-solubilizing compounds are employed in the isocyanate-terminated prepolymer, basic salt-forming compounds, such as tertiary amines, inorganic bases including but not limited to those selected from the group consisting of sodium hydroxide, potassium hydroxide, cesium hydroxide, lithium hydroxide, calcium hydroxide, magnesium hydroxide, zinc hydroxide, and barium hydroxide are used in a sufficient amount (i.e., in a quantity to maintain a pH of greater than about 8) preferably in the water phase, but optionally in the preparation of the prepolymer, to anionically stabilize the dispersions of the present invention through the formation of salts with the incorporated, pendant acidic water-solubilizing groups on the resultant polyurethane. Examples of useful salt-forming compounds include but are not limited to those selected from the group consisting of ammonia, trimethylamine, triethylamine, tripropylamine, triisopropylamine, tributylamine, triethanolamine, diethanolamine, and mixtures thereof. Preferred salt forming compounds include those selected from the group consisting of ammonia, trimethylamine, triethylamine, tripropylamine, and triisopropylamine, since dispersions containing polyurethanes prepared therefrom are less hydrophilic upon coating and cure.

When an amine functional or other basic water-solubilizing compound is used, the polyurethane dispersions preferably maintain a pH of less than about 6 to be cationically stabilized. Examples of useful acidic compounds include but are not limited to those selected from the group consisting of acetic acid, formic acid, citric acid, octanoic acid, phenols and substituted phenols, hydrochloric acid, hydrobromic acid, hydrofluoric acid, and mixtures thereof. These acidic salt-forming compounds are generally a component of the water phase when the polyurethane dispersions of the present invention are prepared; however, they may alternatively be added to the polyurethane prepolymer prior to the dispersion of the prepolymer in the water phase.

However, when straight chain aliphatic or aromatic compounds containing 2 or more isocyanate groups are used it is preferred to add the salt forming compound to the water phase. Certain salts formed by the reaction of salt forming compounds and water solubilizing groups such as potassium hydroxide in combination with a carboxylic acid solubilizing group could result in an undesired isocyanate reaction.

IV. Chain Extenders

The term "chain extender" as used herein includes external chain extenders and blocked external chain extenders such as ketamines and oxazolines. The term chain extender as used refers to externally added chain extenders and excludes those generated in situ. Thus, the chain extension resulting from the reaction of the polyisocyanate compounds with the water of the water phase of the polyurethane dispersions is not denoted by this term and water is not considered an "external" chain extender. Chain extenders are employed to enhance the mechanical properties of the polyurethane of the present invention. Polyols and polyamines useful as chain extenders as the term is used herein are those usually having a number average molecular weight of about 249 or less. The chain extender component must comprise a difunctional chain extender and may optionally comprise a chain extender having a functionality of three or greater. Generally, due to the kinetics involved in the prepolymer and dispersion stages of the methods of the present invention, it is preferable to incorporate hydroxy functional chain extenders in the prepolymer and primary amine functional chain extenders in the water phase when preparing the silyl-terminated polyurethane dispersions. Through proper and judicious selection of reaction conditions, starting materials and additives known in the polyurethane art, such as blocked amines, catalysts, temperature, etc., reaction kinetics can be adapted to allow for the use of primary amines in the prepolymer reaction mixture and hydroxy functional chain extenders in the water phase.

Difunctional Chain Extenders

Examples of useful diol chain extenders include but are not limited to those selected from the group consisting of 1,4-butanediol, ethylene glycol, diethylene glycol, dipropylene glycol, neopentyl glycol, 1,6-hexanediol, 1,4-cyclohexane dimethanol, bis(2-hydroxylethyl)hydroquinone (HQEE), and mixtures thereof.

Difunctional sterically hindered amines are included in the definition of "difunctional chain extender" as used herein except for the difunctional sterically hindered amines of formula II set forth below.

Difunctional sterically hindered amines having the general formula

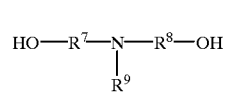

II wherein:

$R^7$, $R^8$, $R^9$ are independently selected from the group consisting of cyclic and aliphatic organic radicals free of isocyanate reactive functional groups, and with the proviso that at least 75% of the $R^9$ groups have at least 4 carbon atoms; are specifically excluded from the difunctional chain extenders useful according to the present invention. Specific examples of these excluded amines are the following: phenyldiethanolamine, n-butyldiethanolamine, etc.

Examples of useful diamine chain extenders include but are not limited to those selected from the group consisting of 4,4'-methylene bis(o-chloroaniline)(MOCA or MBOCA), 2,5-diethyl-2,4-toluene diamine (DETDA), 4,4'-methylene bis(3-chloro-2,6-diethylaniline)(MCDEA), propylene glycol bis(4,4'-aminobenzoate), 3,5-di(thiomethyl)-2,4-toluene diamine, methylene bis(4,4'-aniline)(MDA), ethyl-1,2-di(2-amino thiophenol), 4-chloro-3,5-diamino isobutylbenzoate, 1,2-diaminoethane, 1,4-diaminobutane, 1,6-diaminohexane, N,N'-dialkyl(methylene dianiline), N,N'-dialkyl(1,4-diaminobenzene), and mixtures thereof.

Polyfunctional Chain Extenders

Chain extenders and/or chain extender adducts having more than two isocyanate reactive functional groups, each functional group in the molecule having at least one active hydrogen (i.e., polyfunctional chain extenders) can be included in the polymer; however, difunctional chain extenders are required. Thus triols, tetrols, etc., can be used to introduce branching into the polyurethanes of the invention. These polyfunctional chain extenders are preferably low molecular weight and best utilized with short chain extenders such as 1,4-butanediol or the chain extenders as described infra. Small amounts of branching in the polyurethane backbone improve tensile strength and solvent resistance and decrease cold-flow of the final coatings prepared from the dispersions of the invention. On the other hand, excessive amounts of branching in the polyurethane of the dispersion cause poor flow and thus less desirable film formation, freeze/thaw stability and processibility. Examples of useful polyfunctional chain extenders include but are not limited to those selected from the group consisting of 1,2,6-hexanetriol, 1,1,1-trimethylolethane or propane, pentaerythritol, triisopropanol amine, and triethanol amine.

Catalysts

The polyurethane prepolymer compositions of the present invention may be prepared without the use of a catalyst when the reaction is performed at a sufficient temperature (i.e., about 20° to about 100° C.) to cause the reaction between the polyisocyanate component and the active hydrogen containing compounds of the polyurethane prepolymer mixture. However, a catalyst may optionally be used according to the method of the invention. Depending on reaction conditions (e.g., reaction temperature and/or polyisocyanate used), a catalyst at the level of up to about 0.5 part by weight of the isocyanate-terminated prepolymer typically about 0.00005 to about 0.5 part by weight may be required to form the prepolymer by the methods of the present invention. Examples of useful catalysts include but are not limited to those selected from the group consisting of tin II and IV salts such as stannous octoate and dibutyltin dilaurate, respectively, tertiary amine compounds such as triethyl amine and bis(dimethylaminoethyl) ether, morpholine compounds such as β,β'-dimorpholinodiethyl ether, bismuth carboxylates, zinc-bismuth carboxylates, iron (III) chloride, potassium octoate, and potassium acetate. Examples of other useful catalysts can also be found in *Polyurethanes: Chemistry and Technology*, Part I, Table 30, Chapter 4, Saunders and Frisch, Interscience Publishers, New York, 1963.

Solvents

Although the polyurethanes of the present invention can be prepared without the use of solvents, solvents can be used to control the viscosity of the isocyanate-terminated prepolymer. Examples of useful solvents (which are typically volatile organic compounds) added for this purpose include but are not limited to those selected from the group consisting of ketones, tertiary alcohols, ethers, esters, amides, hydrocarbons, chlorohydrocarbons, chlorocarbons, and mixtures thereof. These are usually stripped at the end of the reaction by vacuum heating.

Solvents may also be required to promote the coalescence of the silyl-terminated polyurethane particles of the dispersion to form a continuous film. Examples of such coalescing solvents for use in the dispersion include but are not limited to those selected from the group consisting of n-methyl pyrrolidinone (NMP), n-butyl acetate, dimethyl formamide, toluene, methoxypropanol acetate (PM acetate), dimethyl sulfoxide (DMSO), ketones, alcohols, dimethyl acetamide, and mixtures thereof.

A polyurethane prepolymer is prepared in the first step of the process of making the silyl-terminated polyurethane dispersions of the present invention. To a reactor equipped with a stirrer, a heater, and a dry gas purge (for example, nitrogen, argon, etc.), the polyisocyanate component is added to the reactor with optional coalescing solvent and optional dry solvent (e.g. anhydrous methylethyl ketone, having $H_2O$ levels of 0.05% or less). The reactor is heated to the reaction temperature (generally from about 20° C. to about 100° C.) and the polyol component, optional catalyst, and the water solubilizing compound is added slowly, keeping the reaction exotherm below 100° C. to minimize unwanted side reactions. Optionally all or a portion of the chain extender component and the isocyanate reactive silane compound can be added at this point. If such optional compounds are included, then the isocyanate reactive functional groups on the chain extender and silane should not contain large amounts of a primary amine because there can be an unacceptable viscosity increase in the prepolymer which could make the dispersion step in water difficult.

As the polyurethane prepolymer is made, additional chain extender and polyisocyanate components can optionally be incorporated into the reaction mixture. In a preferred embodiment of the present method, a polyisocyanate adduct having greater than 2 isocyanate groups can be added after about 80% of the polyisocyanate, polyol and optional chain extender components have converted to the prepolymer. The reaction is then allowed to proceed until the desired excess on an isocyanate equivalent basis of about 1.4 to about 4 times the combined active hydrogen equivalent as contributed by the polyol component, the water solubilizing compound, and optional chain extender component and isocyanate reactive silane compound is achieved.

Optionally the salt forming compound can be added to this polyurethane prepolymer reaction mixture. If the salt forming compound is added, care should be taken to reduce temperature and/or disperse the polyurethane prepolymer in the water phase shortly after this addition. The product of the salt forming compound with the water-solubilizing compound can produce a salt which may in some cases catalyze an unwanted side reaction. This side reaction could result in an undesired viscosity increase making the dispersion step difficult. This rise in viscosity can be minimized or avoided by taking the precautions listed above. Optional solvent can be added at this point to modify the viscosity and/or enhance the processibility of the polyurethane prepolymer. The viscosity of the prepolymer should be low enough (about 70,000 cps or less) to facilitate the dispersion step.

The second step is to make a water phase. The water phase typically comprises water, the salt forming compound, and all or the remainder of the chain extender component and the isocyanate reactive silane compound. Deionized water is used to prevent instability and agglomeration of the polyurethane prepolymer when it is subsequently dispersed into the water phase. Primary amine functional chain extenders and isocyanate reactive silane compounds are preferred in the water phase due to their relatively rapid reactivity with the isocyanate groups of the polyurethane prepolymer. If the final amount of the chain extender component, isocyanate reactive silane compound or salt forming compound has been added previously to the prepolymer, then they need not be added to the water phase. If partial additions of these components and compounds have occurred in the prepolymer, the remaining material may be added to the water phase, assuming compatibility with the water can be achieved, i.e., the components are either water soluble or water dispersible. The pH of the water phase is then measured to assure that the dispersion will be stable. For cationic dispersions, enough salt forming compound is added to assure that the dispersion will be stable. Usually a pH of about 6 or lower is required, with a pH of about 4.5 or less preferred. An anionic dispersion is adjusted to achieve a pH of about 7 or higher, preferably a pH of about 8 or more.

The third step is to disperse the polyurethane prepolymer of the first step into the water phase of the second step. The water phase is added to the holding tank of a homogenizer and sufficient air pressure is supplied to pump the water phase through the homogenizer's high shear rotor. The polyurethane prepolymer is slowly injected into the circulating water phase just prior to the high shear rotor. Care should be taken not to inject material too quickly or the high shear rotor will stop the dispersion process. The dispersed material is then transferred back into the water phase holding tank. On the average two or three passes through the homogenizer typically yields a mean particle size in the range of about 0.06 to about 0.3 microns. However, particle size can vary with equipment, viscosity, presence of solvent temperature, etc. The particle size can be controlled by the viscosity of the first step. The higher the viscosity, generally the larger the particle size.

Introduction of solvents into polyurethane prepolymer reaction mixture will have the result of lowering the particle size. If such an optional solvent was introduced, e.g., methylethyl ketone, the final step would be to strip off the unwanted solvent. This can be accomplished using a wiped film evaporator which applies heat and vacuum to a thin film of the material efficiently stripping off the solvent. Under laboratory conditions, a Haake Rotoevaporator or other similar equipment can be used to remove the solvent.

Optional Additives

One or more additives may be added to the dispersion of the invention including but not limited to those selected from the group consisting of crosslinking agents, plasticizers, thixotropic agents, biocides, adhesion promoters such as silane adhesion promoters, corrosion inhibitors, pigments, colorants, photostabilizers, antioxidants, and antifouling agents. To further enhance the moisture resistivity of the formulated silane terminated polyurethane dispersions about 0 to about 5 parts by weight of a crosslinking agent, preferably about 3 to about 5 parts by weight, based upon 100 parts by weight of the dispersion may be added. Many salt forming compounds contribute to the hydrophilicity of coatings containing polyurethanes prepared therefrom. The crosslinker makes the coating containing such a polyurethane more hydrophobic.

Particularly useful additives in the wood coating formulations of the present invention include but are not limited to defoaming agents such as Surfynol™ DF110L (a high molecular weight acetylenic glycol nonionic surfactant available from Air Products & Chemicals, Inc.), SWS-211 (a polydimethylsiloxane aqueous emulsion, available from Wacker Silicone Corp.), Dehydran™ 1620 (modified polyol/polysiloxane adducts available from Henkel Corp.), and DB-31 (a silicone additive available from Dow Corning), and DB-65 (a silicone additive available from Dow Coming); mar aids such as Byk® 301, Byk® 321 and Byk® 341 (polyether modified polydisiloxane copolymers, all available from Byk Chemie); flow and levelling agents such as Igepal™ CO-630 (an ethoxylated nonylphenol nonionic surfactant available from Rhone-Poulenc Surfactant & Specialty Div.), Surfynol™ 104H (a nonionic surfactant comprising a solution of tetramethyl decynediol in ethylene glycol available from Air Products & Chemicals, Inc.), Surfynol™ 465 (an ethoxylated tetramethyl decynediol nonionic surfactant available from Air Products & Chemicals, Inc.), Fluorad™ FC-129 (a potassium fluorinated alkyl carboxylate anionic surfactant avaible from 3M Co.), Fluorad™ FC-171 (a fluorinated alkyl alkoxylate nonionic surfactant available from 3M Co.), Fluorad™ FC-430 (a fluorinated alkyl ester nonionic surfactant available from 3M Co.), and Rexol™ 25/9 (an alkyl phenol ethoxylate nonionic surfactant available from Hart Chemical Ltd.); coalescing solvents such as those described supra to assist in film formation; thickening agents such as the associative thickeners Acrysol™ ASE-60, Acrysol™ RM-825, Acrysol™ TT-935 and Acrysol™ 615, all available from Rohm and Haas Co.; and photostabilizers including but not limited to ultraviolet light (UV) stabilizers such as Tinuvin™ 144 (a hindered amine photostabilizer), Tinuvin™ 292 (a hindered amine photostabilizer) and Tinuvin™ 328 (an ultraviolet absorber), all commercially available from Ciba-Geigy Ltd. For marine wood coatings of the present invention which are often subject to intense UV exposure, at least about 0.1 part by weight of an ultraviolet light stabilizer per 100 parts by weight silyl-terminated polyurethane dispersion can be used to inhibit and retard the yellowing and photodegradation of such formulations, typically about 0.1 to about 10 parts, preferably about 1 to about 10 parts.

Uses

The dispersions of the invention can be coated on a variety of substrates to form high gloss, water and solvent resistant, tough, scratch resistent, preferably light stable (non-yellowing) films.

Substrates such as leather, woven and nonwoven webs, glass, glass fibers, wood (including oil woods such as teak, etc.), metals (such as aluminum), treated metal such as primed and painted metals (such as those comprising automobile and marine surfaces), polymeric materials and surfaces, such as plastics (appliance cabinets, for example) etc., can be coated with the dispersions or films.

The composition of the invention has utility as an intermediate coating. It is generally applied over the several primer and sealer layers (well known to those skilled in the art) used to coat metal (including primed metal and painted metal), plastic, and fiber-reinforced plastic composite substrates used in the fabrication of vehicular bodyparts and appliance cabinets. Vehicular bodyparts include, for example, hoods, fenders, bumpers, grills, rocker panels and the like; and appliance cabinets include, for example, washers, clothes dryers, refrigerators, and the like. Examples of vehicles on which the compositions can be used include automobiles, trucks, bicycles, airplanes, etc. The composition of the invention can be used as an intermediate coating because it is applied under top/finish coatings which typically comprise paints, enamels, and lacquers and the like that in many cases are chemically crosslinked to provide durable, scratch-resistant surface finishes. The composition of the invention adheres to most body filler compositions and thus also has utility in the autobody repair trade.

The composition of the invention can also be coated onto composite materials, such as fiber reinforced plastics wherein the plastics are toughened by the addition of glass, boron, graphite, ceramic, or dissimilar polymer fibers; and filled plastics wherein the plastic properties are modified by the addition of inorganic powders, (such as calcium carbonate, talc, titanium dioxide, carbon black, etc.), flakes (such as aluminum, mica, etc.), and microspheres/beads (such as glass or polymeric). The composition of the invention can be coated onto a number of articles such as vehicular body parts and appliance cabinets.

The compositions of the invention may also be coated on surfaces such as concrete, asphalt, etc. (roadways, patios, sidewalks, etc.). An adhesive backed pavement marking tape may be adhered thereto.

Compositions of the present invention for use as UV stabilized coatings such as furniture and/or marine finishes can be formulated to retard or eliminate the effects of UV degradation by combining cycloaliphatic isocyanates, such as isophorone and bis(cyclohexyl)diisocyanate, with UV stabilizers and antioxidants. Moisture adsorption/permeation can be minimized by the use of the relatively more hydrophobic polyester based polyols. Coating elasticity can be controlled by adjusting the isocyanate equivalent to active hydrogen ratio, chain extender content and the crosslink density of the cured film. The crosslink density can be controlled by adjusting such parameters as the urethane branching coefficient and molecular weight per crosslink.

The UV stabilized coating composition of the invention comprises about 85 to about 99.9% by weight dispersion of the invention, about 0.1 to about 10% by weight of a photostabilizer, about 0 to about 10% by weight of a surfactant, and about 0 to about 10% by weight of a thickening agent based upon the total weight of the coating composition, and total 100%. Preferably the wood coating composition comprises about 90 to about 97% by weight dispersion of the invention, and 0.2 to about 5% by weight photostabilizer, about 0.1 to about 6% by weight of a surfactant, and about 0.1 to about 1% by weight of a thickening agent based upon the total weight of the coating composition. Most preferably, the wood coating composition of the invention comprises about 92 to about 96 percent by weight dispersion of the invention, about 1 to about 3% by weight photostabilizer, about 1 to about 5% by weight surfactant and about 0.1 to about 0.5 percent by weight thickening agent, based upon the total weight of the coating composition.

The dispersion of the present invention can be used as a component in a chip-resistant coating composition.

Test Methods

Stability

The long term stability of the polyurethane dispersions was assessed both at room temperature (23° C.) and at elevated temperature (71° C.) according to a modification of American Society for Testing and Measurement (ASTM) Test Method D 1791-87. A 100 mL sample of polyurethane dispersion was placed in a clean, dry test bottle. The test bottle was then capped and inverted and placed in either a drying oven capable of maintaining a temperature of the dispersion at 71° C. or in a device capable of maintaining room temperature. At the end of a 30-day storage period, the sample dispersions rated "good" were those which did not gel or separate over that storage period. Samples dispersions rated "poor" gelled or separated over this 30-day period under these storage conditions.

Viscosity Measurements

The bulk viscosity of each polyurethane dispersion was determined by using Brookfield Viscometer Model RVF. Approximately 1 liter of the dispersion was poured into the chamber and placed in the thermostat.

The measurement was taken after thermal equilibrium was reached. Spindles #1–#4 were used depending on the viscosity of the sample. The data are included in Table 1.

Water/Solvent Resistance

A 2"×3" rectangular area on an unpolished, cold rolled, 10.16 cm (4 inch)×30.48 cm (12 inch)×0.0126 cm (0.032 inch) steel test panel (available from Advanced Coating Technologies, Inc. as test panel BEPI P60 DIW) was coated with the polyurethane dispersion. The dispersion was then cured on the test panels for 7 days at 21° C. and 50% relative humidity.

The dried film thickness was approximately 100 $\mu$m (4 mils). About ⅓ of the coating was immersed in deionized water at 21° C. with no water circulation. After 8 hrs. the panels were removed from the water, dried and visually inspected for blistering, swelling, loss of adhesion or any other visually discernable changes. The above procedure was repeated by immersing the coated steel test panels in a solvent (methyl ethyl ketone).

Mechanical Properties

Mechanical testing (i.e., tensile and elongation) was performed on an Sintech Model 10 tensile tester. Testing was performed according to a modification of American Society for Testing and Measurement (ASTM) Test Method D 412-87. Samples were prepared according to Method A (dumbbell and straight specimens) of this test method. Dumbbell specimens approximately 0.318 cm (0.125 inch) in width and approximately 0.159 cm (0.0625 inch) in thickness (cross-sectional area of approximately 0.051 cm$^2$) were tested at a crosshead speed of 5.08 cm/min (2 inches/min) and the results of these measurements recorded and listed in Table 1.

Adhesion to Wood

The adhesion of polyurethane wood finishes prepared from polyurethane dispersions to wood test panels was measured according to a modification of Method B of American Society for Testing and Measurement (ASTM) Test Method D3359-83. Oak plywood panels 0.635 cm (¼ inch) in thickness which were pretreated with an acrylate based sealer (High Bond Sealer commercially available from Bona Kemi USA Inc.) and then coated with a polyurethane finish (3–4 coats applied using a brush, allowing a minimum of 45 minutes dry time and light sanding with 120 grit sandpaper between coats). The dried cured polyurethane coating was approximately 125 $\mu$m in thickness. Using a razor blade, 6 cuts of about 20 mm in length spaced 2 mm apart were made in the cured coating, followed by similarly spaced cuts at 90° to and centered on the original cuts. An about 75 mm piece of a transparent cellophane pressure-sensitive adhesive tape (610 tape, commercially available from 3M Co.) was placed in firm contact with the cross-cut area, allowed to dwell for about 90 seconds on the sample, and peeled rapidly from the cross-cut area at approximately 180°. The cross-cut grid area was then examined under magnification and rated using the following scale:

5B The edges of the cuts were completely smooth; none of the squares of the lattice is detached.

4B Small flakes of the coating were detached at intersections; less than 5170 of the area was affected.

3B Small flakes of the coating were detached along edges and at intersections of cuts. The area affected was 5 to 15% of the lattice.

2B The coating was flaked along the edges and on parts of the squares. The area affected was 15 to 35% of the lattice.

1B The coating was flaked along the edges of cuts in large ribbons and whole squares were detached. The area affected was 35 to 65% of the lattice.

0B Flaking and detachment were worse than grade 1B.
Impact Resistance

The impact resistance of wood panels coated with a polyurethane finish prepared from the polyurethane dispersions of the present invention was measured in the following manner: Oak plywood panels 0.635 cm (¼ inch) in thickness were pretreated with an acrylate based sealer (High Bond Sealer commercially available from Bona Kemi USA Inc.) and then coated with a polyurethane finish (3–4 coats applied using a brush, allowing a minimum of 45 minutes dry time and light sanding with 120 grit sandpaper between coats). The dried cured polyurethane coating was approximately 125 μm in thickness. A 500 gram stainless steel rod was dropped through a cylinder from set distances. The rod hits the impinger which in turn hits the coated panels. The distance in centimeters at which the impact of this 500 gram rod on coatings did not cause any crack of the coatings was recorded.

Taber Abrasion

Wood finishes prepared from the polyurethane dispersions of the present invention were coated (3–4 coats applied using a brush, allowing a minimum of 45 minutes dry time and light sanding with 120 grit sandpaper between coats) on laminated kitchen counter tops and cured for 6 weeks at 21° C. (Formica™ high pressure laminated sheets of melamine and phenolic plastics). These coatings were subjected to abrasion using either H-22 wheel, 500 gm weight or CS-17 wheel, 1 kg weight for 50–1000 cycles. The amount of weight loss from these coatings due to abrasion of these wheels in a Taber abrader was determined by weighing the samples before and after abrasion and weight loss was recorded. This test provides information on wear properties of coatings and is an indirect measurement of durability.

Solvent Resistance

The solvent resistance of wood finishes prepared from the polyurethane dispersions of the present invention was measured in the following manner: Oak plywood panels 0.635 cm (¾ inch) in thickness were pretreated with an acrylate based sealer (High Bond Sealer commercially available from Bona Kemi USA Inc.) and then coated with a polyurethane finish (3–4 coats applied using a brush, allowing a minimum of 45 minutes dry time and light sanding with 120 grit sandpaper between coats). The dried cured polyurethane coating was approximately 125 μm in thickness. The coated test panels were allowed to cure at ambient conditions (21° C. and 60–75% relative humidity) for six weeks. Paper dots having a diameter of 0.953 cm (⅜ inch) were applied on the coated surface and the dots were saturated with 14 different test solvents, including 100% methyl ethyl ketone, a range of binary mixtures of ethanol and water or methyl ethyl ketone and water, and ternary mixtures of ethanol, methyl ethyl ketone and water. The dots were then dried for four hours. The following rating scheme for solvent resistance was applied:

2 points—paper dots were removed cleanly from the coatings;

1 point—paper dots removed, but paper residue was left on the coating; and, 0 point—paper dots did not remove from the coating.

According to this test method, the maximum attainable rating was a score of 28.

Gloss

The gloss of wood finishes prepared from the polyurethane dispersions of the present invention was measured in the following manner: Oak plywood panels 0.635 cm (¾ inch) in thickness were pretreated with an acrylate based sealer (High Bond Sealer commercially available from Bona Kemi USA Inc.) and then coated with a polyurethane finish (3–4 coats applied using a brush, allowing a minimum of 45 minutes dry time and light sanding with 120 grit sandpaper between coats). The dried cured polyurethane coating was approximately 125 μm in thickness. The gloss of such prepared polyurethane finish surfaces was then measured using a reflectometer (Lange Reflectometer, Model RB-60) against a calibration standard at a 60° angle of reflection. The calibration standard was a polished, high gloss plate defined in accordance with the stipulations of DIN 67530.

Stain Resistance

The stain resistance of wood finishes prepared from the polyurethane dispersions of the present invention was measured in the following manner in accordance with ANSI A 161.1-1985 ("Recommended Performance Standard for Kitchen and Vanity Cabinets"): Oak plywood panels 0.635 cm (¾ inch) in thickness were pretreated with a sealer (typically High Bond Sealer commercially available from Bona Kemi USA Inc.) and then coated with a polyurethane finish (3–4 coats applied using a brush, allowing a minimum of 45 minutes dry time and light sanding with 120 grit sandpaper between coats). The dried cured polyurethane coating was approximately 125 μm in thickness. 3 cc samples of vinegar, lemon juice, grape juice, tomato catsup, coffee, milk, were applied to the polyurethane wood finishes for 24 hours and then wiped off and examined for stain development. Similarly, 3 cc samples of mustard, permanent marker and 3% ammonia were applied to the sample finishes, removed after one hour, and the finish was examined for stain development from these samples. Stain resistance was ranked according to the following scale: 2 points for no indication of these staining agents and 0 points for any degree of staining. Thus, the maximum recorded stain resistance ranking according to this test method is 22.

Weathering Resistance

The weathering resistance of wood finishes prepared from the polyurethane dispersions of the present invention was measured in the following manner in accordance with American Society for Testing and Materials (ASTM) Test Method G-26 ("Standard Practice for Operating Light-Exposure Apparatus (Xenon-Arc Type) With and Without Water Exposure of Nonmetallic Materials"): Teak panels 30.5 cm (12 inches) in length, 3.81 cm (1.5 inches) in width and 0.318 cm (0.375 inch) in thickness were coated with a polyurethane finish (3 coats applied using a soft brush, allowing a minimum of 1 hour dry time between coats). Although not required, each coating can be followed by light sanding with a 600 grit sandpaper between coats; however, at least 4 hours must be allowed between sanding and the application of a subsequent coat. For comparative solvent-borne coatings, at least 24 hours between sanding and application of the next coat was required. All examples were then allowed to cure for one week at room temperature (21° C.) and 50% relative humidity and cut into six 5 cm test sections.

The coated test sections were then placed in a xenon-arc light-exposure apparatus as described in Test Method A ("Continuous Exposure to Light and Intermittent Exposure to Water Spray") of ASTM-G 26 (1988) using a Type BH humidity controlled light-exposure device and exposed to repeated cycles of 102 minutes of light from this xenon-arc source, followed by a 18 minute cycle of light and water spray. A black panel temperature of 63° C. was maintained throughout the test. For each coating sample, a coated teak wood test section was then removed from the test apparatus at 250, 500, 1000, 2000 and 3000 hours and the weathering of the coating was assessed and recorded.

| ABBREVIATIONS | |
|---|---|
| A-1110 | γ-aminopropyltrimethoxysilane commercially available from OSi |
| AA | acetic acid |
| Cythane ™ 3160 | a trifunctional polyisocyanate adduct of trimethylolpropane and m-tetramethylxylene diisocyanate, commercially available from American Cyanamid Co. |
| DES W | 4,4-cyclohexylmethyl diisocyanate commercially available from Miles Coating Division under the tradename "Desmodur W" |
| DMPA | α,α-(bishydroxy methyl) propionic acid |
| EDA | 1,2-diaminoethane |
| Excess NCO | an excess on an isocyanate equivalent basis when compared to the combined active hydrogen equivalent of other components in the polyurethane prepolymer or dispersion |
| eq. | equivalent |
| HCA | hydrocaffeic acid |
| IPDI | isophorone diisocyanate |
| Irganox ™ 245 | a hindered phenolic antioxidant commercially available from Ciba-Geigy Ltd. |
| Irganox ™ 1010 | a hindered phenolic antioxidant commercially available from Ciba-Geigy Ltd. |
| LEX1130-30 | Lexorez ™ 1130-30, a linear poly(1,6-hexanediol-adipate) of 1870 average equivalent weight commercially available from Inolex |
| LEX1130-55 | Lexorez ™ 1130-55, a linear poly(1,6-hexanediol-adipate) of 1020 average equivalent weight commercially available from Inolex |
| LEX1400-35 | Lexorez ™ 1400-35, a linear poly(1,6-hexanediol-neopentyl glycol-adipate) of 1600 average equivalent weight commercially available from Inolex |
| LEX1400-120 | Lexorez ™ 1400-120, a linear poly(1,6-hexanediol-neopentyl glycol-adipate) of 470 average equivalent weight commercially available from Inolex |
| MDEA | methyldiethanol amine |
| MEK | methyl ethyl ketone |
| NCO/OH | molar ratio of isocyanate to hydroxy groups |
| NMP | n-methyl pyrrolidone |
| ARCOL ™ 2025 | poly(oxypropylene) glycol of 1000 average equivalent weight commercially available from ARCO Chemical. |
| Silane Q2-8038 | γ-aminopropylmethyl dimethoxysilane commercially available from Dow Corning Co. |
| T-9 | a stannous octanoate catalyst commercially available from Air Products Co. |
| T-12 | a dibutyltin dilaurate catalyst commercially available from Air Products Co. |
| TDI | toluene diisocyanate |
| TEA | triethylamine |
| Terethane ™-2000 | a poly(tetramethylene ether glycol) of 1000 average equivalent weight commercially available from duPont |
| Tinuvin ™ 144 | a hindered amine photostabilizer commercially available from Ciba-Geigy Ltd. |
| Tinuvin ™ 292 | a hindered amine photostabilizer commercially available from Ciba-Geigy Ltd. |
| Tinuvin ™ 328 | an ultraviolet absorber commercially available from Ciba-Geigy Ltd. |
| TMP | 1,1,1-trimethylolpropane |
| Tone ™ 201 | a caprolactone-based diol of 265 average equivalent weight commercially available from Union Carbide Chemicals and Plastics Co. |
| Tone ™ 210 | a caprolactone-based diol of 425 average equivalent weight commercially available from Union Carbide Chemicals and Plastics Co. |
| Tone ™ 230 | a caprolactone-based diol of 623 average equivalent weight commercially available from Union Carbide Chemicals and Plastics Co. |
| Tone ™ 260 | a caprolactone-based diol of 1500 average equivalent weight commercially available from Union Carbide Chemicals and Plastics Co. |

EXAMPLES

The invention is further illustrated by the following nonlimiting examples. All parts, percentages, ratios, etc. in the examples and the rest of the specification are by weight unless otherwise specified.

Example 1

A prepolymer was made in a 1 liter reaction flask equipped with a heating mantel, condenser, stirring blade, nitrogen inlet and thermometer equipped with a temperature controller. 308.23 grams (2.3351 eq.) of 4,4'-cyclohexylmethane diisocyanate (DES W), 360.72 grams (0.5787 eq.) of Tone™ 230 (a caprolactone-based polyol), 40.10 grams (0.5976 eq.) of 2,2-bis(hydroxymethyl) propionic acid (DMPA) and 125.10 grams of n-methyl pyrrolidone (NMP) were heated with stirring to 40–50° C. 0.081 gram of dibutyl tin dilaurate (T-12) was added and the mixture was heated to 80° C. and allowed to react for 2 hours.

A premix was made with 325.00 grams of distilled water, 5.28 grams of triethylamine (TEA), 6.00 grams (0.1997 eq.) of EDA and 6.00 grams (0.0335 eq.) of gamma-aminopropyltrimethoxysilane (A-1110).

170.15 grams (0.2363 eq.) of the prepolymer was added over 10 minutes to the premix solution in a Microfluidics Homogenizer Model # HC-5000 at an air line pressure of 0.621 MPa. A stable dispersion was formed, pH and viscosity were recorded, and the dispersion was subjected to both room temperature (RT) and elevated temperature (71° C.) stability testing. The dispersion was then cured for 1 week at 70° F. and 50% Relative Humidity (R.H.) and the cured composition's water resistance, solvent (methyl ethyl ketone) resistance, tensile strength, and elongation was measured. These properties were recorded and can be found in Table 1. The U.B.C. was calculated to be 1.868.

Comparative Example C-1

Comparative Example C-1 was prepared according to the "Best Mode of the Invention" in U.S. Pat. No. 4,582,873 (Gaa et al.) with a few minor variations. The silylated isocyanate-containing-prepolymer was prepared in an anhydrous reaction conducted in the presence of a solvent and a catalyst. A slight nitrogen blanket was maintained during the reaction. To a clean and dry kettle reactor having an agitator there was added 236.50 grams of the polyester diol commercially available under the trade designation "Tone 200" from Union Carbide Corporation. This material has a molecular weight of around 530 and was premelted at 180° C. Also added was 10.20 grams of the hydrophilic ethylene oxide-containing material, which is a polyoxyethylene polyol homopolymer available under the trade designation "Carbowax 1450" material. This material is also available from Union Carbide Corporation and was also premelted at 180° C. Also added was 1.24 grams of 1,4-butanediol as the hardening segment polyol. The difunctional organosilane, N-(β-aminoethyl),γ-aminopropyl trimethoxysilane available from Union Carbide Corporation under the trade designation "A-1120" was added in an amount of 4.59 grams. As a solvent n-methyl-pyrrolidone (NMP) was added in an amount of 46.05 grams. These materials were heated to 140° F. (60° C.).

Over a period of 30 minutes while the temperature was maintained between 140° F. (60° C.) to 150° F. (66° C.), 258.35 g of methylene-bis-(4-cyclohexyl isocyanate) were added to the kettle reactor with agitation. This cycloaliphatic diisocyanate is available under the trade designation Desmodur W material from Miles Coating Division. An additional amount of NMP (35.15 g) was used to rinse the beaker and added to the mixture. This mixture was held at 140° F. (60° C.) to 150° F. (66° C.) for 10 minutes.

An amount of 26.75 grams of DMPA was added and the temperature was maintained between 170° F. (77° C.) and 175° F. (79° C.) for 30 minutes.

0.25 grams of the catalyst dibutyl tin dilaurate was added. The temperature was held at 170° F.–175° F. until a constant NCO equivalent of around 1045 to 1087 was obtained.

An amount of 15.20 grams of n-methyl pyrrolidone was added while cooling to 160°–165° F. Over 10 minutes, 20.20 grams of triethylamine were added to neutralize the mixture. The beaker was rinsed with 2.25 g NMP which was then added to the mixture.

A premix was made with 9.04 grams ethylenediamine and 526.44 grams of water. 340.30 grams of the prepolymer was injected into the premix in a Microfluidics Homogenizer Model #HC-5000 at an air line pressure of 0.621 mPa over a period of 10 minutes. The amounts and types of neutralizer and chain extender used in the production of the aqueous dispersion of the chain-extended polymer gave the dispersion a pH of 8.3. No particles formed in the dispersion. The viscosity of the dispersion was 32,000 centipoise.

Comparative Example C-2

Comparative Example C-2 was prepared according to Example I of U.S. Pat. No. 3,941,733 (Chang) with a few minor variations. Into a 2-liter round-bottom glass flask equipped for heating, cooling, agitation and vacuum stripping were charged 675.15 grams of polyoxypropylene diol (average equivalent wt. 490) and 17.15 grams of polyoxypropylene triol (average equivalent wt. 137). A vacuum was applied and the solution was heated to 130–140° C. for 30 minutes. The solution was then cooled to 40° C. and 235.30 grams of toluene diisocyanate (80:20 percent mixture of 2,4-toluene diisocyanate and 2,6-toluene diisocyanate) were added. The solution temperature increased to 65°–70° C. and was maintained in that range for 2 hours. To the reaction mixture was added 0.15 grams of a 25% solution of stannous octoate in dioctyl phthalate and stirring was continued, temperature being maintained at 65°–70° C. for an additional 3 hours. The solution was cooled to 60°–65° C. and diluted with 100.00 grams of methyl ethyl ketone to decrease the viscosity.

A solution of isocyanate-reactive water-soluble salt was prepared by dissolving 72.18 grams of the triethylamine salt of αα-bis(hydroxymethyl) propionic acid in 21.21 grams of methyl ethyl ketone.

To 1027.75 grams of the vigorously stirred intermediate prepolymer solution under a dry nitrogen blanket are added 18.69 grams of an isocyanate-reactive trialkoxysilane, triethoxysilylpropyl amine $H_2N(CH_2)_3Si(OC_2H_5)_3$ and mixed 10–15 minutes followed by 93.39 grams of the above triethylamine salt solution. Stirring is continued for 2 minutes followed by the addition of 15 g MEK. A 340.30 gram aliquot of the reaction mixture is dispersed in 557.86 grams water in the range of 20°–65° C. by a high-shear mechanical homogenizer (Microfluidics Homogenizer Model # HC-5000 at an air line pressure or 0.621 MPa).

Example 2

A prepolymer having a lower molecular weight polyester polyol segment was made in a 1 liter reaction flask equipped with a heating mantel, condenser, stirring blade, nitrogen inlet and thermometer equipped with a temperature controller to monitor temperature. 426.78 grams (3.233 eq.) of 4,4'-cyclohexylmethane diisocyanate (DES W), 212.40 grams (0.8015 eq.) of Tone™ 201 (a caprolactone-based polyol), 55.53 grams (0.8276 eq.) of 2,2-bis(hydroxymethyl) propionic acid (DMPA) and 122.76 grams of n-methyl pyrrolidone (NMP) were heated with stirring to 40–50° C. 0.112 gram of dibutyl tin dilaurate (T-12) was added and the mixture was heated to 80° C. and allowed to react for 2 hours.

A premix was made with 325.00 grams of distilled water, 7.48 grams of triethylamine (TEA), 8.50 grams (0.2829 eq.) of ethylene diamine (EDA) and 8.50 grams (0.0474 eq.) of gamma-aminopropyltrimethoxysilane (A-1110).

170.15 grams (0.3338 eq.) of the prepolymer was added over 10 minutes to the premix solution in a Microfluidics Homogenizer Model # HC-5000 at an air line pressure of 0.621 MPa. A stable dispersion was formed, pH and viscosity were recorded, and the dispersion was subjected to both room temperature (RT) and elevated temperature (71° C.) stability testing. The dispersion was then cured for 1 week at 70° F. and 50% Relative Humidity (R.H.) to a thickness of 4 mils and the cured composition's water resistance, solvent (methyl ethyl ketone) resistance, tensile strength, and elongation was measured. These properties were recorded and can be found in Table 1. The U.B.C. was calculated to be 1.867.

Example 3

A prepolymer having a high molecular weight polyester polyol was made in a 1 liter reaction flask equipped with a heating mantel, condenser, stirring blade, nitrogen inlet and thermometer equipped with a temperature controller to monitor temperature. 151.74 grams (1.1495 eq.) of 4,4'-cyclohexylmethane diisocyanate (DES W), 427.37 grams (0.2849 eq.) of Tone™ 260 (a caprolactone-based polyol), 19.74 grams (0.2942 eq.) of 2,2-bis(hydroxymethyl) propionic acid (DMPA) and 257.60 grams of n-methyl pyrrolidone (NMP) were heated with stirring to 40–50° C. 0.040 gram of dibutyl tin dilaurate (T-12) was added and the mixture was heated to 80° C. and allowed to react for 2 hours.

A premix was made with 325.00 grams of distilled water, 2.51 grams of triethylamine (TEA), 2.85 grams (0.0948 eq.) of ethylene diamine (EDA) and 2.85 grams (0.0159 eq.) of gamma-aminopropyltrimethoxysilane (A-1110).

170.15 grams (0.1133 eq.) of the prepolymer was added over IO minutes to the premix solution in a Microfluidics Homogenizer Model #HC-5000 at an air line pressure of 0.621 MPa. A stable dispersion was formed, pH and viscosity were recorded, and the dispersion was subjected to both room temperature (RT) and elevated temperature (71° C.) stability testing. The dispersion was then cured for 1 week at 70° F. and 50% Relative Humidity (R.H.) to a thickness of 4 mils and the cured composition's water resistance, solvent (methyl ethyl ketone) resistance, tensile strength, and elongation was measured. These properties were recorded and can be found in Table 1. The U.B.C. was calculated to be 1.869.

Example 4

A prepolymer having lower solubilizing acid content was made in a 1 liter reaction flask equipped with a heating mantel, condenser, stirring blade, nitrogen inlet and thermometer equipped with a temperature controller to monitor temperature. 284.52 grams (2.1555 eq.) of 4,4'-cyclohexylmethane diisocyanate (DES W), 418.86 grams (0.6720 eq.) of Tone™ 230 (a caprolactone-based polyol), 27.77 grams (0.4139 eq.) of 2,2-bis(hydroxymethyl) propionic acid (DMPA) and 129.00 grams of n-methyl pyrrolidone (NMP) were heated with stirring to 40–50° C. 0.075 gram of dibutyl tin dilaurate (T-12) was added and the mixture was heated to 80° C. and allowed to react for 2 hours.

A premix was made with 322.00 grams of distilled water, 4.75 grams of triethylamine (TEA), 4.80 grams (0.1797 eq.) of ethylene diamine (EDA) and 5.40 grams (0.0301 eq.) of gamma-aminopropyltrimethoxysilane (A-1110).

170.15 grams (0.2116 eq.) of the prepolymer was added over 10 minutes to the premix solution in a Microfluidics Homogenizer Model #HC-5000 at an air line pressure of 0.621 MPa. A stable dispersion was formed, pH and viscosity were recorded, and the dispersion was subjected to both room temperature (RT) and elevated temperature (71° C.) stability testing. The dispersion was then cured for 1 week at 70° F. and 50% Relative Humidity (R.H.) to a thickness of 4 mils and the cured composition's water resistance, solvent (methyl ethyl ketone) resistance, tensile strength, and elongation was measured. These properties were recorded and can be found in Table 1. The U.B.C. was calculated to be 1.867.

Example 5

A prepolymer having higher solubilizing acid content was made in a 1 liter reaction flask equipped with a heating mantle, condenser, stirring blade, nitrogen inlet and thermometer equipped with a temperature controller to monitor temperature. 403.07 grams (3.0536 eq.) of 4,4'-cyclohexylmethane diisocyanate (DES W), 228.06 grams (0.3659 eq.) of Tone™ 230 (a caprolactone-based polyol), 78.68 grams (1.1726 eq.) of 2,2-bis(hydroxymethyl) propionic acid (DMPA) and 304.00 grams of n-methyl pyrrolidone (NMP) were heated with stirring to 40–50° C. 0.106 gram of dibutyl tin dilaurate (T-12) was added and the mixture was heated to 80° C. and allowed to react for 2 hours.

A premix was made with 248.00 grams of distilled water, 5.72 grams of triethylamine (TEA), 6.50 grams (0.2163 eq.) of ethylene diamine (EDA) and 6.50 grams (0.0363 eq.) of gamma-aminopropyltrimethoxysilane (A-1110).

170.15 grams (0.2543 eq.) of the prepolymer was added over 10 minutes to the premix solution in a Microfluidics Homogenizer Model #HC-5000 at an air line pressure of 0.621 MPa. A stable dispersion was formed, pH and viscosity were recorded, and the dispersion was subjected to both room temperature (RT) and elevated temperature (71° C.) stability testing. The dispersion was then cured for 1 week at 70° F. and 50% Relative Humidity (R.H.) to a thickness of 4 mils and the cured composition's water resistance, solvent (methyl ethyl ketone) resistance, tensile strength, and elongation was measured. These properties were recorded and can be found in Table 1. The U.B.C. was calculated to be 1.867.

Comparative Example C-3

A prepolymer having insufficient solubilizing acid (DMPA) content was made in a 1 liter reaction flask equipped with a heating mantle, condenser, stirring blade, nitrogen inlet and thermometer equipped with a temperature controller to monitor temperature. 237.1 grams (1.7962 eq.) of 4,4'-cyclohexylmethane diisocyanate (DES W), 420.76 grams (0.6750 eq.) of Tone 230 (a caprolactone-based polyol), 15.42 grams (0.2298 eq.) of 2,2-bis(hydroxymethyl) propionic acid (DMPA) and 119.00 grams of n-methyl pyrrolidone (NMP) were heated with stirring to 40–50° C. 0.0625 gram of dibutyl tin dilaurate (T-12) was added and the mixture was heated to 80° C. and allowed to react for 2 hours.

A premix was made with 318.00 grams of distilled water, 4.31 grams of triethylamine (TEA), 4.90 grams (0.1631 eq.) of ethylene diamine (EDA) and 4.9 grams (0.0273 eq.) of gamma-aminopropyltrimethoxysilane (A-1110).

170.15 grams (0.1914 eq.) of the prepolymer was added over 10 minutes to the premix solution in a Microfluidics Homogenizer Model #HC-5000 at an air line pressure of 0.621 MPa. The polyurethane dispersion was initially stable, but some of the dispersion settled to the bottom after 5 days storage at room temperature due to partial agglomeration of the dispersion. The U.B.C. was calculated to be 1.867.

Comparative Example C-4

A prepolymer having no polyester polyol and an excess of solubilizing acid was made in a 1 liter reaction flask equipped with a heating mantel, condenser, stirring blade, nitrogen inlet and thermometer equipped with a temperature controller to monitor temperature. 483.68 grams (3.6642 eq.) of 4,4'-cyclohexylmethane diisocyanate (DES W), 123.88 grams (1.8462 eq.) of 2,2-bis(hydroxymethyl) propionic acid (DMPA) and 260.4 grams of n-methyl pyrrolidone (NMP) were heated with stirring to 40–50° C. 0.127 gram of dibutyl tin dilaurate (T-12) was added and the mixture was heated to 80° C. and allowed to react for 2 hours.

A premix was made with 264.00 grams of distilled water, 7.97 grams of triethylamine (TEA), 9.1 grams (0.3028 eq.) of ethylene diamine (EDA) and 9.1 grams (0.0508 eq.) of gamma-aminopropyltrimethoxysilane (A-1110).

170.15 grams (0.3563 eq.) of the prepolymer was added over 10 minutes to the premix solution in a Microfluidics Homogenizer Model #HC-5000 at an air line pressure of 0.621 MPa. The material gelled during emulsification. The U.B.C. was calculated to be 1.867.

Comparative Example C-5

A prepolymer having an excess of diisocyanate (NCO/OH=5) was made in a 1 liter reaction flask equipped with a heating mantel, condenser, stirring blade, nitrogen inlet and thermometer equipped with a temperature controller to monitor temperature. 459.92 grams (3.4842 eq.) of 4,4'-cyclohexylmethane diisocyanate (DES W), 213.66 grams (0.3428 eq.) of Tone 230 (a caprolactone-based polyol), 23.75 grams (0.3539 eq.) of 2,2-bis(hydroxymethyl) propionic acid (DMPA) and 122.43 grams of n-methyl pyrrolidone (NMP) were heated with stirring to 40–50° C. 0.048 gram of dibutyl tin dilaurate (T-12) was added and the mixture was heated to 80° C. and allowed to react for 2 hours.

A premix was made with 475.00 grams of distilled water, 12.94 grams of triethylamine (TEA), 6.0 grams (0.1997 eq.) of ethylene diamine (EDA) and 67.3 grams (0.3753 eq.) of gamma-aminopropyltrimethoxysilane (A-1110).

170.15 grams (0.5785 eq.) of the prepolymer was added over 10 minutes to the premix solution in a Microfluidics Homogenizer Model #HC-5000 at an air line pressure of 0.621 MPa. The material gelled during emulsification. The U.B.C. was calculated to be 1.510.

Example 6

A low molecular weight urethane polymer (average molecular weight 4800) was prepared by emulsifying the 170.15 grams (0.2363 eq.) of the prepolymer of Example 1 with a premix consisting of 340.00 grams of distilled water, 5.28 grams of triethylamine (TEA), 4.67 grams (0.1554 eq.)

of ethylene diamine (EDA) and 13.93 grams (0.0777 eq.) of gamma-aminopropyltrimethoxysilane (A-1110). A stable dispersion was formed, pH and viscosity were recorded, and the dispersion was subjected to both room temperature (RT) and elevated temperature (71° C.) stability testing. The dispersion was then cured for 1 week at 70° F. and 50% Relative Humidity (R.H.) to a thickness of 4 mils and the cured composition's water resistance, solvent (methyl ethyl ketone) resistance, tensile strength, and elongation was measured. These properties were recorded and can be found in Table 1. The U.B.C. was calculated to be 1.718.

Example 7

A high molecular weight (average molecular weight 100,000) was prepared by emulsifying the 170.15 grams (0.2363 eq.) of the prepolymer of Example 1 with a premix consisting of 316.00 grams of distilled water, 5.28 grams of triethylamine (TEA), 6.90 grams (0.2296 eq.) of ethylenediamine (EDA) and 0.64 gram (0.0036 eq.) of gamma-aminopropyltrimethoxysilane (A-1110). A stable dispersion was formed, pH and viscosity were recorded, and the dispersion was subjected to both room temperature (RT) and elevated temperature (71° C.) stability testing. The dispersion was then cured for 1 week at 70° F. and 50% Relative Humidity (R.H.) to a thickness of 4 mils and the cured composition's water resistance, solvent (methyl ethyl ketone) resistance, tensile strength, and elongation was measured. These properties were recorded and can be found in Table 1. The U.B.C. was calculated to be 1.985.

Comparative Example C-6

A urethane polymer of very low molecular weight (average molecular weight 3300) was prepared by emulsifying the 170.15 grams (0.2363 eq.) of the prepolymer of Example 1 with a premix consisting of 351.00 grams of distilled water, 5.28 grams of triethylamine (TEA), 3.55 grams (1181 eq.) of ethylene diamine (EDA) and 20.6 grams (0.1149 eq.) of gamma-aminopropyltrimethoxysilane (A-1110). A stable dispersion was not formed. The prepolymer immediately agglomerated upon mixing with the water phase. The U.B.C. was calculated to be 1.609.

Example 8

A prepolymer having higher catalyst and solvent content was made using only the heat generated from the exotherm (e.g., no external heat added, maximum temperature from the exotherm=70° C.) in a 1 liter reaction flask equipped with a condenser, stirring blade, nitrogen inlet and thermometer. 308.23 grams (2.3351 eq.) of 4,4'-cyclohexylmethane diisocyanate (DES W), 360.72 grams (0.5787 eq.) of Tone™ 230 (a caprolactone-based polyol), 40.10 grams (0.5976 eq.) of 2,2-bis(hydroxymethyl) propionic acid (DMPA), 305.50 grams of n-methyl pyrrolidone (NMP), and 4.16 grams of dibutyl tin dilaurate (T-12) were combined and the mixture was allowed to react for 2 hours.

A premix was made with 238.00 grams of distilled water, 4.32 grams of triethylamine (TEA), 4.90 grams (0.1631 eq.) of ethylene diamine (EDA) and 4.90 grams (0.0273 eq.) of gamma-aminopropyltrimethoxysilane (A-1110).

170.15 grams (0.1935 eq.) of the prepolymer was added over IO minutes to the premix solution in a Microfluidics Homogenizer Model #HC-5000 at an air line pressure of 0.621 MPa. A stable dispersion was formed, pH and viscosity were recorded, and the dispersion was subjected to both room temperature (RT) and elevated temperature (71° C.) stability testing. The dispersion was then cured for 1 week at 70° F. and 50% Relative Humidity (R.H.) to a thickness of 4 mils and the cured composition's water resistance, solvent (methyl ethyl ketone) resistance, tensile strength, and elongation was measured. These properties were recorded and can be found in Table 1. The U.B.C. was calculated to be 1.868.

Example 9

A prepolymer was made using an alternative catalyst (i.e. triethylamine) in a 1 liter reaction flask equipped with a heating mantel, condenser, stirring blade, nitrogen inlet and thermometer equipped with a temperature controller to monitor temperature. 308.23 grams (2.3351 eq.) of 4,4'-cyclohexylmethane diisocyanate (DES W), 360.72 grams (0.5787 eq.) of Tone™ 230 (a caprolactone-based polyol), 40.10 grams (0.5976 eq.) of 2,2-bis(hydroxymethyl) propionic acid (DMPA) and 125.10 grams of n-methyl pyrrolidone (NMP) were heated with stirring to 40–50° C. 4.16 grams of triethylamine (TEA) was added and the mixture was heated to 80° C. and allowed to react for 2 hours.

A premix was made with 325.00 grams of distilled water, 5.28 grams of triethylamine (TEA), 6.00 grams (0.1997 eq.) of ethylene diamine (EDA) and 6.00 grams (0.0335 eq.) of gamma-aminopropyltrimethoxysilane (A-1110).

170.15 grams (0.2352 eq.) of the prepolymer was added over 10 minutes to the premix solution in a Microfluidics Homogenizer Model #HC-5000 at an air sine pressure of 0.621 MPa. A stable dispersion was formed, pH and viscosity were recorded, and the dispersion was subjected to both room temperature (RT) and elevated temperature (71° C.) stability testing. The dispersion was then cured for 1 week at 70° F. and 50% Relative Humidity (R.H.) to a thickness of 4 mils and the cured composition's water resistance, solvent (methyl ethyl. ketone) resistance, tensile strength, and elongation was measured. These properties were recorded and can be found in Table Y. The U.B.C. was calculated to be 1.867.

Example 10

A prepolymer was made using an alternative solubilizing compound (i.e., methyldiethanol amine) in a 1 liter reaction flask equipped with a heating mantel, condenser, stirring blade, nitrogen inlet and thermometer equipped with a temperature controller to monitor temperature. 308.23 grams (2.3351 eq.) of 4,4'-cyclohexylmethane diisocyanate (DES W), 360.72 grams (0.5787 eq.) of Tone™ 230 (a caprolactone-based polyol), 35.61 grams (0.5976 eq.) of methyldiethanol amine (MDEA) and 124.30 grams of n-methyl pyrrolidone (NMP) were heated with stirring to 40–50° C. 0.081 gram of dibutyl tin dilaurate (T-12) was added and the mixture was heated to 80° C. and allowed to react for 2 hours.

To a 170.15 gram (0.2378 eq.) aliquot of the prepolymer at 50° C. was added 10.00 grams methyl ethyl ketone (MEK) and 25.00 grams (0.8326 eq.) glacial acetic acid (0.8326 eq.). This prepolymer mixture was then emulsified in 200.00 grams of distilled water.

A premix was made with 125.00 grams of distilled water, 25.00 grams of acetic acid, 6.00 grams (0.1997 eq.) of ethylene diamine (EDA) and 6.00 grams (0.0335 eq.) of gamma-aminopropyltrimethoxysilane (A-1110).

Dropwise and with stirring, 162.00 grams of the premix was added to 405.15 grams of the prepolymer dispersion. The MEK was then stripped off under heat and vacuum. A stable dispersion was formed, pH and viscosity were recorded, and the dispersion was subjected to both room temperature (RT) arid elevated temperature (71° C.) stability testing. A pH of 4.5 was measured aid a viscosity of 10 cps. The U.B.C. was calculated to be 1.868.

Example 11

A prepolymer was made using an alternative solubilizing compound (i.e., hydrocaffeic acid) in a 1 liter reaction flask equipped with a heating mantel, condenser, stirring blade, nitrogen inlet and thermometer equipped with a temperature controller to monitor temperature. 308.23 grams (2.3351 eq.) of 4,4'-cyclohexylmethane diisocyanate (DES W), 382.00 grams (0.6129 eq.) of Tone™ 230 (a caprolactone-based polyol), 51.25 grams (0.5626 eq.) of hydrocaffeic acid (HCA) and 130.80 grams of n-methyl pyrrolidone (NMP) were heated with stirring to 40–50° C. 0.081 grams of dibutyl tin dilaurate (T-12) was added and the mixture was heated to 80° C. and allowed to react for 2 hours.

To a 170.15 gram (0.2262 eq.) aliquot of the prepolymer at 50° C. was added 10.0)0 grams methyl ethyl ketone (MEK) and 5.28 grams triethylamine. This prepolymer mixture was then emulsified in 200.00 grams of distilled water.

A premix was made with 125.00 grams of distilled water, 5.75 grams (0.1913 eq.) of ethylene diamine (EDA), and 5.75 grams (0.0321 eq.) of gamma-aminopropyltrimethoxysilane (A-1110).

Dropwise and with stirring 136.50 grams of the premix was added to 385.43 grams of the prepolymer dispersion. The MEK was then stripped off under heat and vacuum. The dispersion remained stable for 5 days at a recorded pH of 10.5. The U.B.C. was calculated to be 1.867.

Example 12

A prepolymer was made in a 1 liter reaction flask equipped with a heating mantel, condenser, stirring blade, nitrogen inlet and thermometer equipped with a temperature controller to monitor temperature. 200.00 grams (1.8002 eq.) of isophorone diisocyanate (IPDI), 277.48 grams (0.4452 eq.) of Tone™ 230 (a caprolactone-based polyol), 30.85 grams (0.4598 eq.) of 2,2-bis(hydroxymethyl) propionic acid (DMPA) and 225.00 grams of methyl ethyl ketone (MEK) were heated with stirring to 40–50° C. 0.25 gram of dibutyl tin dilaurate (T-12) was added and the mixture was heated to 80° C. and allowed to react for 2 hours.

A premix was made with 325.00 grams of distilled water, 5.28 grams of triethylamine (TEA), 5.21 grams (0.1734 eq.) of ethylene diamine (EDA) and 5.16 grams (0.0288 eq.) of gamma-aminopropyltrimethoxysilane (A-1110).

170.15 grams (0.2076 eq.) of the prepolymer was added over 10 minutes to the premix solution in a Microfluidics Homogenizer Model #HC-5000 at an air line pressure of 0.621 MPa. A stable dispersion was formed. The MEK was then stripped off under heat and vacuum. The U.B.C. was calculated to be 1.870.

Example 13

A prepolymer was made in a 1 liter reaction flask equipped with a heating mantel, condenser, stirring blade, nitrogen inlet and thermometer equipped with a temperature controller to monitor temperature. 156.27 grams (1.7962 eq.) of toluene diisocyanate (TDI), 157.21 grams (0.1121 eq.) of Arcol E-351 polyether polyol (an ethylene oxide capped polyoxypropylene diol of 1402.5 av. eq. weight commercially available from Arco Chemical Company), 30.85 grams (0.4598 eq.) of 2,2-bis(hydroxymethyl) propionic acid (DMPA) and 300 grams of methyl ethyl ketone (MEK) were heated with stirring to 40–50° C. Next, 0.06 g of bis(lauryl,dibutyltin)oxide was added and the mixture was heated to 80° C. and allowed to react for 2 hours.

The prepolymer was chain extended with 50.00 grams 1,4-butanediol and the reaction was allowed to run for another 30 minutes. The prepolymer was then capped with 22.22 grams (0.1131 eq.) of γ-mercaptopropyltrimethoxysilane (A-189). The end capping reaction was catalyzed with 1 gram of Dabco 33LV (triethylene diamine at 33% solids in dipropylene glycol) for 30 minutes.

173.00 grams (0.2363 eq.) of the polymer was emulsified in 325 grams of distilled water and 5.28 grams of triethylamine. The polymer was added to the water-amine solution over 2–4 minutes. The solvent was then removed from the emulsion with a roto-evaporator. The U.B.C. was calculated to be 1.937.

TABLE 1

| Ex. No. | RT Stability | 160° F. Stability (days to gel) | pH | Viscosity (cps) | $H_2O$ Resistance | MEK Resistance | Tensile (psi) | Elongation (%) |
|---|---|---|---|---|---|---|---|---|
| 1 | Good | 18 | 8.5 | 20 | Good | Good | 4834 | 177 |
| C-1 | Good | 18 | 8.3 | 32,000 | Poor | Poor | 447 | 319 |
| 2 | Good | 7 | 7.5* | 22 | Good | Good | 2466 | 102 |
| C-2 | Poor | 18 | 7.5* | 12.5 | — | — | 208** | >500 |
| 3 | Good | 28 | 9.8 | 18 | Good | Good | 2115 | 7 |
| C-3 | Poor | — | 10.1 | 15 | — | — | — | — |
| 4 | Good | 25 | 8.0* | 22 | Good | Good | 1890 | 235 |
| C-4 | Gelled during emulsification | | | | | | | |
| 5 | Good | 7 | 7.4* | 25 | Good | Good | — | — |
| C-5 | Gelled during emulsification | | | | | | | |
| C-6 | Gelled during emulsification | | | | | | | |
| 7 | Good | 18 | 7.4* | 15 | Good | Good | 2820 | 331 |
| 8 | Good | 11 | 9.4 | 15 | Good | Good | 3234 | 226 |
| 9 | Good | 25 | 8.9 | 200 | Good | Good | 2358 | 211 |

*pH adjusted to approx. 8.5 using 28% $NH_4OH$
**Tensile strength at 500% elongation - not at failure or break

WOOD COATING EXAMPLES

Example 14

A wood furnishing coating was made in the following manner: A prepolymer having a lower molecular weight polyester polyol segment was made in a 0.5 liter reaction flask equipped with a heating mantel, condenser, stirring blade, nitrogen inlet and thermometer. 170.95 grams (1.533 eq.) of isophorone diisocyanate (IPDI), 121.07 grams (0.291 eq.) of Tone 210™ (a caprolactone-based diol), 19.32 grams (0.288 eq.) of 2,2-bis(hydroxymethyl) propionic acid (DMPA), 10.34 grams (0.229 eq.) of 1,4 butanediol, 6.65 grams (0.147 eq.) of TMP, and 11.14 grams of N-methyl pyrrolidone (NMP) were heated with stirring to 60–80° C. 0.04 gram of T-9 (a stannous octanoate catalyst) was added and the mixture was allowed to heat at 80° C. for an 1 hour. After 80% of the monomers in this mixture were converted to prepolymer as measured by standard titrametric procedures with a dibutylamine and HCl indicator solution, 13.95 grams (0.0367 eq.) of Cythane™ 3160 (a trifunctional polyisocyanate adduct) was then added and the mixture was reacted for another 45 minutes.

A premix was made with 402.00 grams of deionized water, 7.44 grams of triethylamine (TEA), 6.40 grams (0.2133 eq.) of ethylene diamine (EDA) and 6.83 grams (0.061 eq.) of Silane Q2-8038 (γ-aminopropylmethyl dimethoxy silane).

200.00 grams (0.305 eq.) of the prepolymer was emulsified in the premix solution. The polyurethane dispersion was made into finish by incorporating the proper levelling, wetting, defoaming, thickening, surface active, and mar resistant agents and other additives as given below. This finish was then coated and cured on an oak panel as specified in the above test methods and tested for solvent resistance, stain resistance and gloss. The results of these tests may be found in Table 2. The U.B.C. was calculated to be 1.84.

| Polyurethane Dispersion | 100.0 grams |
| Byk ™ 301[1] | 0.27 grams |
| FC-129 (1%)[2] | 0.92 grams |
| Igepal ™ CO-630[3] | 0.22 grams |
| SWS 211[4] | 0.55 grams |
| Acrylsol ™ TT935[5] | 0.82 grams |
| Butyl Carbitol[6] | 3.5 grams |
| Propylene Glycol[6] | 2.5 grams |
| D.I. Water | 2.73 grams |
| Adjusted pH | 8.5 grams |

[1] a mar aid and defoaming agent available from Byk Chemie
[2] a fluorochemical surfactant available from 3M Co.
[3] a surfactant commercially available from Rhone-Poulenc
[4] an antifoam emulsion available from Wacker Silicone Corp.
[5] a thickener available from Rohm and Haas
[6] optional coalescing agents

Example 15

A wood furniture coating was prepared according to the method of Example 14, except without the incorporation of the polyfunctional isocyanate adduct in the prepolymer. A prepolymer was prepared from 125.00 grams (1.12 eq.) of IPDI, 134.72 grams (0.2161 eq.) of Tone™ 230 (a high molecular weight polycaprolactone diol), 17.00 grams (0.2537 eq.) of DMPA, 7.20 grams (0.1598 eq.) of 1,4-butanediol, 3.00 grams (0.0672 eq.) of TMP, 0.02 grams of T-9 stannous octanoate catalyst, 4.75 grams of stabilizers (3.25 grams Tinuvin™ 144 and 1.50 grams Irganox™ 245), 10.00 grams of NMP, and 30.00 grams of MEK.

The polyurethane dispersion was prepared by adding 250.00 grams of the prepolymer to a premix solution containing 508.00 grams of deionized water, 9.66 grams of triethylamine, 8.10 grams (0.27 eq.) of ethylene diamine, and 5.40 grams (0.0482 eq.) of Silane Q2-8038 (γ-aminopropylmethyl dimethoxysilane) and then the MEK was stripped from the dispersion.

The polyurethane dispersion was made into a finish, which was then coated and cured on an oak panel as specified in the above test methods and tested for solvent resistance, stain resistance and gloss. The results of these tests may be found in Table 2.

TABLE 2

| Example No. | 14 | 15 |
| --- | --- | --- |
| Solvent Resistance* | 28 | 19 |
| Stain Resistance** | 20 | 18 |
| Gloss | 83.3 | 83.7 |

*Maximum score attainable 28
**Maximum score attainable 22

Examples 14 and 15 demonstrate the improved solvent and stain resistance in these wood furniture coating formulations resulting from the addition of the polyfunctional isocyanate adduct to the polyurethane prepolymer. These wood furniture finishes also exhibit excellent stain resistance and gloss comparable to or exceeding those properties of polyurethane products which are currently commercially available.

Wood Floor Coatings

Example 16

A polyurethane coating employing a mixture of polyether and polyester polyols which is useful as a wood floor finish was made according to the method of Example 14. A prepolymer was prepared from a mixture of polyester and polyether polyols from 131.06 grams (1.175 eq.) of IPDI, 39.40 grams (0.0394 eq.) of Terethane™-2000 (a poly (tetramethylene ether glycol)), 119.84 grains (0.1923 eq.) of Tone™ 230 (a caprolactone-based polyol) 17.57 grams (0.2622 eq.) of DMPA, 2.54 grams (0.5638 eq.) of 1,4-butanediol, 3.33 grams (0.0746 eq.) of TMP. After 80% of the monomers in this mixture were converted to prepolymer as measured by standard titrametric procedures with a dibutylamine and HCl indicator solution, 15.71 grams (0.0413 eq.) of Cythane™ 3160 (a trifunctional polyisocyanate adduct), 16.00 grams of NMP, 28.0 grams of MEK, 0.04 gram of T-9, and 3.0 grams of stabilizers (2.00 grams Tinuvin™ 292 and 1.00 gram Irganox™ 245).

The dispersion was prepared by adding 150.00 grams (132.45 grams solids) of the above prepolymer into a premix solution containing 305.00 grams of deionized water, 5.00 grams of triethylamine, 5.50 grams (0.1833 eq.) of EDA, and 5.40 grams (0.0482 eq.) of Silane Q2-8038, followed by the stripping of the MEK.

The polyurethane dispersion was made into a wood floor finish, which was then coated and cured on an oak panel as specified in the above test methods and tested for solvent resistance, abrasion resistance, impact resistance and adhesion to a wood flooring sample. The results of these tests may be found in Table 3. The U.B.C. was calculated to be 1.999.

Example 17

A polyurethane wood floor finish was prepared in accordance with Example 16, except that a higher amount of isocyanate-reactive silane compound was incorporated in the premix; i.e., 5.93 grams (0.0529 eq.) of Silane Q2-8038 (γ-aminopropylmethyl dimethoxysilane).

The polyurethane wood floor finish was then coated and cured on an oak panel as specified in the above test methods and tested for solvent resistance, abrasion resistance, impact resistance and adhesion to a wood flooring sample. The results of these tests may be found in Table 3. The U.B.C. was calculated to be 2.014.

Example 18

A polyurethane coating employing a polyester polyol which is useful as a wood floor finish was made according to the method of Example 14. A prepolymer was prepared from 152.33 grams (1.3482 eq.) of IPDI, 150.68 grams (0.319)7 eq.) of LEX1400-120 (a linear poly(1,6-hexanediol-neopentyl glycol-adipate)), 16.38 grams (0.2444 eq.) of DMPA, 4.06 grams (0.090 eq.) of 1,4-butanediol, 6.55 grams (0.1467 eq.) of TMP. After 80% of the monomers in this mixture were converted to prepolymer as measured by standard titrametric procedures with a dibutylamine and HCl indicator solution, 14.75 grams (0.0388 eq.) of Cythane™ 3160 (a trifunctional polyisocyanate adduct), 0.04 gram of T-9 catalyst, 16.00 grams of NMP, 28.00 grams of MEK, and 4.00 grams of stabilizers (2.00 grams Tinuvin™ 292 and 2.00 grams Irganox™ 1010).

The dispersion was prepared by adding 150.00 grams (133.20 grams solids) of prepolymer to a premix solution containing 305.00 grams of deionized water, 5.03 grams of triethylamine, 5.40 (0.18 eq.) of EDA and 5.40 grams (0.0482 eq.) of Silane Q2-8038 (γ-aminopropylmethyl dimethoxysilane), and the MEK was removed.

The polyurethane dispersion was made into a wood floor finish, which was then coated and cured on an oak panel as specified in the above test methods and tested :For solvent resistance, abrasion resistance, impact resistance and adhesion to a wood flooring sample. The results of these tests may be found in Table 3.

Example 19

A polyurethane coating employing a mixture of polyether polyols which is useful as a wood floor finish was made according to the method of Example 14. A prepolymer was prepared from 103.55 grams (0.9287 eq.) of IPDI, 150.19 grams (0.1502 eq.) of ARCOL™ 2025 (a poly(propylene glycol)), 28.37 grams (0.0279 eq.) of Terethane™-2000 (a poly(tetramethylene ether glycol)), 2.27 grams (0.05039 eq.) of 1,4-butanediol, 15.60 grams (0.2328 eq.) of DMPA, 18.00 grams of NMP, 0.04 gram of T-9 catalyst, and total 6.00 grams of stabilizers (2.00 grams Tinuvin™ 292, 2.00 grams Tinuvin™ 328, and 2.00 grams Irganox™ 1010).

The dispersion from this prepolymer was made by adding 125.00 grams (118.00 grams solids) of prepolymer into a premix containing a solution of 250.00 grams of deionized water, 4.49 grams of triethylamine, 4.51 grams (0.1503 eq.) EDA and 3.13 grams (0.0279 eq.) of Silane Q2-8038 (γ-aminopropylmethyl dimethoxysilane), and the MEK was removed.

The polyurethane dispersion was made into a wood floor finish, which was then coated and cured on an oak panel as specified in the above test methods and tested for solvent resistance, abrasion resistance, impact resistance and adhesion to a wood flooring sample. The results of these tests may be found in Table 3.

Example 20

A polyurethane wood floor finish was prepared in accordance with Example 19, except that a higher amount of isocyanate-reactive silane compound was incorporated in the premix; i.e., 4.88 grams (0.0435 eq.) of Silane Q2-8038 (γ-aminopropylmethyl dimethoxysilane).

The polyurethane wood floor finish was then coated and cured on an oak panel as specified in the above test methods and tested for solvent resistance, abrasion resistance, impact resistance and adhesion to a wood flooring sample. The results of these tests may be found in Table 3.

Example 21

A polyurethane coating employing a crystallizable polyester polyol which is useful as a wood floor finish was made according to the method of Example 14. A prepolymer was prepared from 63.00 grams (0.5650 eq.) of IPDI, 130.00 grams (0.06952 eq.) of LEX1130-30 (a linear poly(1,6hexanediol adipate)), 11.00 grains (0.1642 eq.) of DMPA, 1.3 grams (0.0288 eq.) of 1,4-butanediol, 0.50 grams (0.1119 eq.) of TMP, 0.04 gram of T-9 catalyst, 10.00 grams of NMP, 40.00 grams of MEK, and total stabilizers of 5.08 grams of stabilizers (2.14 grams Tinuvin™ 292, 2.27 grams Tinuvin™ 328, and 0.67 gram Irganox™ 1010).

The dispersion was made from this prepolymer by adding 150.00 grams (121.20 grams solids) of the prepolymer into a premix solution containing 300.00 grams of deionized water, 4.72 grams of triethylamine, 3.89 grams (0.1297 eq.) of EDA, and 4.50 (grams 0.0402 eq.) of Silane Q2-8038 (γ-aminopropylmethyl dimethoxysilane), and MEK was removed.

The polyurethane dispersion was made into a wood floor finish which was then coated and cured on an oak panel as specified in the above test methods and tested for solvent resistance, abrasion resistance, impact resistance and adhesion to a wood flooring sample. The results of these tests may be found in Table 3.

Example 22

A polyurethane coating employing a mixture of crystallizable polyester polyols which is useful as a wood floor finish was made according to the method of Example 14. A prepolymer was prepared from 32.00 grams (0.2869 eq.) of IPDI, 49.00 grams (0.0262 eq.) of LEX1 130-30 (a higher molecular weight linear poly(1,6-hexanediol adipate)), 12.7 grams (0.1245 eq.) of LEX1130-55 (a lower molecular weight linear poly(1,6-hexanediol adipate)), 5.34 grams (0.0797 eq.) of DMPA, 0.25 grams (0.0559 eq.) of TMP, 0.04 gram of T-9 catalyst, 3.00 grams of NMP, and 12.0 grams of MEK.

The dispersion was prepared by adding 100.00 grams (86.96 grams solids) of the prepolymer into a premix solution containing 200.00 grams deionized water, 3.39 grams triethylamine, 2.54 grams (0.0849 eq.) of EDA, 3.9 grams (0.0348 eq.) of Silane Q2-8038 (γ-aminopropylmethyl dimethoxysilane), and then the MEK was removed.

The polyurethane dispersion was made into a wood floor finish which was then coated and cured on an oak panel as specified in the above test methods and tested for solvent resistance, abrasion resistance, impact resistance and adhesion to a wood flooring sample. The results of these tests may be found in Table 3.

Example 23

A polyurethane coating employing a mixture of crystallizable polyester polyols which is useful as a wood floor finish was made according to the method of Example 14. A prepolymer was prepared from 35.55 grams (0.3188 eq.) of IPDI, 48.89 grams (0.03055 eq.) of LEX1400-35 (a higher molecular weight poly(1,6-hexanediol adipate)), 8.89 grams (0.0189 eq.) of LEX1400-120 (a higher molecular weight poly(1,6-hexanediol adipate)), 4.89 grams (0.0730 eq.) of DMPA, 1.78 grams (0.0399 eq.) of TMP, 0.04 gram of T-9 catalyst, 5.00 grams of NMP, and 20.00 grams of MEK.

The dispersion was prepared by adding 100.00 grams of prepolymer into a premix solution containing 200.00 grams of deionized water, 3.01 grams of triethylamine, 3.00 grams (0.10 eq.) of EDA, and 3.00 grams of silane Q2-8038 (γ-aminopropylmethyl dimethoxysilane), and the MEK was removed.

The polyurethane dispersion was made into a wood floor finish which was then coated and cured on an oak panel as specified in the above test methods and tested for solvent resistance, abrasion resistance, impact resistance and adhesion to a wood flooring sample. The results of these tests may be found in Table 3.

based polyol), 40.10 grams (0.5976 eq.) of 2,2-bis (hydroxymethyl) propionic acid (DMPA) and 125.10 grams of n-methyl pyrrolidone (NMP) were heated with stirring to 40–50° C. 0.081 gram of dibutyl tin dilaurate (T-12) was added and the mixture was heated to 80° C. and allowed to react for 2 hours.

A premix was made with 325.00 grams of distilled water, 5.28 grams of triethylamine (TEA), 6.00 grams (0.1997 eq.) of ethylene diamine (EDA) and 6.00 grams (0.0335 eq.) of gamma-aminopropyltrimethoxysilane (A-1110).

170.15 grams (0.2363 eq.) of the prepolymer was added over 10 minutes to the premix solution in a Microfluidics Homogenizer Model #HC-5000 at an air line pressure of 0.621 MPa. The polyurethane dispersion was made into a coating by blending the proper wetting and light stabilizing

TABLE 3

| Ex. | Abrasion Resistance (grams lost) H-22, 50 cycles, 500 grams | Abrasion Resistance (grams lost) CS-17, 1000 cycles, 1000 grams | Solvent Resistance | Impact Resistance, (cm) | Adhesion |
| --- | --- | --- | --- | --- | --- |
| 16 | 6.5 | 27.3 | 28 | 20 | 5B |
| 17 |  | 18.3 | 28 | >80 | 5B |
| 18 | 7.2 |  | 28 |  | 5B |
| 19 |  | 19.8 | 28 | >80 | 5B |
| 20 |  | 14.5 | 28 | >80 | 5B |
| 21 |  | 4.5 | 22 | >80 | 5B |
| 22 |  | 6.4 | 26 | >80 | 5B |
| 23 |  | 18.8 | 28 | >80 | 5B |
| C4 | 11.3 | 29.2 | 28 |  |  |
| C5 | 16.2 |  |  |  |  |
| C6 | 13.7 | 32.5 | 28 |  |  |

C4 is Street Shoe, a two part crosslinked waterborne polyurethane floor coating available from Basic Coatings Co.
C5 is Pacific Strong, a one part crosslinked waterborne polyurethane floor coating available from Bona Kemi USA Inc.
C6 is Ultracure Cure, a two part crosslinked waterborne polyurethane floor coating available from Bona Kemi USA Inc.

Table 3 illustrates several significant aspects in formulating wood finishes from the polyurethane dispersions of the present invention. The effect of level of isocyanate reactive silane on the durabilty of these coatings is demonstrated by the superior abrasion resistance of Examples 17 and 20, which contain greater than 3.5 grams of silane/100 grams prepolymer, when compared respectively to Examples 16 and 19 which have a lower isocyanate reactive silane content. Furthermore, Table 3 indicates the effect of polyol molecular weight on the durability (i.e., abrasion resistance), solvent resistance and impact resistance of the polyurethane coatings of the present invention. In general, polyurethane coatings containing higher molecular weight polyols, such as Examples 21 and 22, exhibit higher durability and flexibility than similar compositions comprising lower molecular weight polyol segments, such as the compositions of Examples 16–20 and 23. This enhanced toughness, however, comes at the expense of reduced solvent resistance.

Example 24

A marine wood coating was prepared based on the silyl-terminated urethane dispersions of the present invention as follows: A prepolymer was made in a 1 liter reaction flask equipped with a heating mantel, condenser, stirring blade, nitrogen inlet and thermometer equipped with a temperature controller to monitor temperature. 308.23 grams (2.3351 eq.) of 4,4'-cyclohexylmethane diisocyanate (DES W), 360.72 grams (0.5787 eq.) of Tone™ 230 (a caprolactoneagents and other additives as given below with the polyurethane dispersion in a low shear air mixer for 10 minutes. Addition of 0.01 and 0.05 g of a thickening agent to separate dispersions, followed by mixing for 10 minutes, resulted in wood coatings having viscosities of 375 and 6000 cps, respectively.

| Polyurethane Dispersion | 100.0 grams |
| --- | --- |
| Mackamine ™ CO[1] | 2.0 grams |
| Tergitol ™ TMN-3[2] | 1.0 gram |
| Tinuvin ™ 292[3] | 1.0 gram |
| Tinuvin ™ 1130[4] | 1.0 gram |
| Alcogum ™[5] | 0.01 gram |

[1] an alkyl amine oxide wetting agent available from McIntyre Group, Ltd.
[2] a 2,6,8-trimethyl-4-nonyl oxypolyethylene oxyethanol wetting agent available from Union Carbide Co.
[3] a hindered amine photostabilizer commercially available from Ciba-Geigy Ltd.
[4] a phenolic based antioxidant commerciaily available from Ciba-Geigy Ltd.
[5] a sodium polyacrylate associative thickener available from Alco Chemical Corp.

This finish was then coated and cured on a teak wood panel as specified in the above test method and tested for weathering resistance. The results of these tests may be found in Table 4, along with weathering resistance test data for solventborne commercially available coating formulations and the unmodified silyl-terminated polyurethane dispersion composition of Example 1.

TABLE 4

| Example | 250 hours | 500 hours | 1000 hours | 2000 hours | 3000 hours |
|---------|-----------|-----------|------------|------------|------------|
| 24 | No change | No change | No change | No change | No change |
| 1 | No change | Loss of surface gloss | Coating yellowing and flaking | As at 1000 hours, flaking worse | 50% of coating gone |
| C-7[1] | No change | No change | Losing gloss, coating dull | No change to 1000 hours | As at 2000 hours, but worse |
| C-8[2] | No change | No change | Losing gloss, coating dull | No change to 1000 hours | Loss of gloss, yellowing |
| C-9[3] | No change | No change | Losing gloss, coating dull | No change to 1000 hours | Loss of gloss, yellowing |

[1] Epifanes ™, manufactured by W. Heeren en Zoon, B.V., a solventborne one part alkyd resin marine varnish;
[2] Dolphinite ™ 1600, manufactured by Kop-Coat Inc., a solventborne one part alkyd resin marine varnish;
[3] Interlux ™ #95, manufactured by Cortaulds Coatings, Ltd., a solventborne one part alkyd resin marine varnish.

Table 4 illustrates the superior weathering performance of the marine coatings of the present invention, particularly when formulated with proper light stabilizing, wetting and thickening agents. The dispersion of Example 24 also demonstrates that weathering resistance of the silyl-terminated polyurethane dispersion meets or exceeds the weatherability of traditional, less desirable solvent based coating compositions.

Various modifications and alterations of this invention will become apparent to those skilled in the art without departing from the scope and spirit of this invention, and it should be understood that this invention is not to be unduly limited to the illustrative embodiments set forth herein.

We claim:

1. A method of making a silyl-terminated polyurethane in an aqueous dispersion comprising the steps of
    (a) reacting a mixture comprising:
        (i) a polyol component comprising a compound having two isocyanate reactive functional groups and optionally a compound having greater than two isocyanate reactive functional groups, each isocyanate reactive functional group having at least one active hydrogen;
        (ii) a water-solubilizing compound, wherein the water solubilizing compound possesses at least one water solubilizing group and at least one isocyanate reactive functional group, each isocyanate reactive functional group containing at least one active hydrogen;
        (iii) a polyisocyanate component comprising a compound having two isocyanate groups and optionally further comprising a compound having greater than two isocyanate groups;
        (iv) optional polar organic coalescing solvent; and
        (v) optional catalyst;
    at a sufficient temperature in order to facilitate reaction of the mixture to form an isocyanate-terminated polyurethane prepolymer; wherein the ratio of the isocyanate groups of the polyisocyanate component to the water solubilizing groups of the water solubilizing compound is such that the prepolymer can provide a stable dispersion upon combination with a water phase; and
    (b) preparing a stable silyl-terminated polyurethane dispersion by combining, under sufficient agitation and at a sufficient temperature and pH, the isocyanate terminated polyurethane prepolymer prepared according to the step of element (a) with elements comprising:
        (i) deionized water;
        (ii) an isocyanate reactive silane compound having at least one active hydrogen; and
        (iii) a salt forming compound selected from the group consisting of basic salt forming compounds and acidic salt forming compounds, wherein the salt forming compound is selected such that the salt forming compound is reactive with the water solubilizing group in the water solubilizing compound; wherein some or all of the salt forming compound is alternatively added to the mixture of step (a) prior to or during reaction, or to the isocyanate terminated polyurethane prepolymer prior to the combination of the isocyanate terminated polyurethane prepolymer with the water;
    further comprising a chain extender component as at least one of component (a)(vi) or (b)(iv), wherein the chain extender component comprises a difunctional chain extender having two isocyanate reactive functional groups and optionally a polyfunctional chain extender having at least three isocyanate reactive functional groups, each isocyanate reactive functional group having at least one active hydrogen;
    wherein sufficient polyisocyanate component is included in step (a) to provide an excess, on an isocyanate equivalent basis, of about 1.4 to about 4 times the combined active hydrogen equivalent of the isocyanate reactive functional groups of the polyol component, the water-solubilizing compound, and the chain extender component, if present as component (a)(vi); and
    wherein a sufficient amount of the chain extender component and the isocyanate reactive silane is present relative to excess polyisocyanate component such that the active hydrogen to isocyanate group ratio is about 0.85:1 to about 1:1; and wherein the optional polar organic coalescing solvent of element (a) (iv) can optionally be added to the water prior to the formation of the dispersion.

2. The method of claim 1 wherein said water solubilizing compound possesses at least one water solubilizing group and at least two isocyanate reactive functional groups.

3. The method of claim 1 wherein said polyol is selected from the group consisting of poly(oxypropylene) glycols, ethylene oxide capped poly(oxypropylene) glycols, poly (oxytetramethylene) glycols, -omega-diamino poly (oxypropylene), aromatic amine-terminated poly (oxypropylene), graft-polyether polyols, poly(oxyethylene) polyols, polyglycol adipates, polyethylene terephthalate polyols, polycaprolactone polyols, polybutadiene polyols, hydrogenated polybutadiene polyols, -omega-diamino poly(oxytetramethylene), polythioether polyols, polybutylene oxide polyols, polyoxytetramethylene/ethylene oxide random copolymer polyols, fluorinated polyether polyols, acrylic polyols, and polycarbonate polyols, and mixtures thereof;
    wherein said water solubilizing compound is selected from the group consisting of:
    $[H_2N(CH_2)_nCH_2]_2NCH_3$ wherein n is an integer of 1 to 3;
    $(HOCH_2)_2C(CH_3)COOH$;
    $[HO(CH_2)_nCH_2]_2NCH_3$ wherein n is an integer of 1 to 3;
    $H_2N-C_2H_4-NH-C_2H_4-SO_3H$;

H$_2$N—C$_3$H$_6$—N(CH$_3$)—C$_3$H$_6$—SO$_3$H;

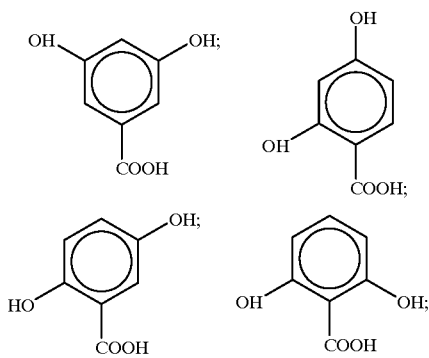

HOCH$_2$—CH(OH)—CO$_2$Na;
[(HOCH$_2$)$_2$CHCH$_2$—COO]$^-$[NH(CH$_3$)$_3$]$^+$;

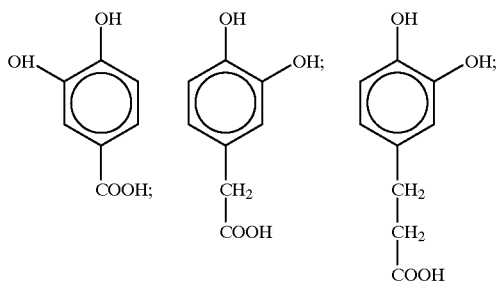

CH$_3$(CH$_2$)$_2$CH(OH)—CH(OH)(CH$_2$)$_3$CO$_2$K;
(HOC$_2$H$_4$)$_2$N—C$_3$H$_6$—OSO$_3$Na;
[H$_2$N—C$_2$H$_4$—NH—C$_2$H$_4$—N(CH$_3$)$_3$]$^+$Cl$^-$;

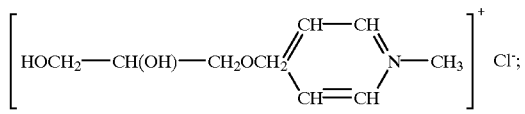

(HOCH$_2$CH$_2$)$_2$NC$_6$H$_4$OCH$_2$CH$_2$OSO$_2$OH;
[(H$_2$N)$_2$C$_6$H$_3$SO$_3$]$^-$[NH(C$_2$H$_5$)$_3$]$^+$; and mixtures thereof;
wherein said difunctional chain extender is selected from the group consisting of 1,4-butanediol, ethylene glycol, diethylene glycol, dipropylene glycol, neopentyl glycol, 1,6-hexanediol, 1,4-cyclohexane dimethanol, bis(2-hydroxylethyl) hydroquinone, 4,4'-methylene bis(o-chloroaniline), 2,5-diethyl-2,4-toluene diamine, 4,4'-methylene bis(3-chloro-2,6-diethylaniline), propylene glycol bis(4,4'-aminobenzoate), 3,5-di(thiomethyl)-2,4-toluene diamine, methylene bis(4,4'-aniline), ethyl-1,2-di(2-amino thiophenol), 4-chloro-3,5-diamino isobutylbenzoate, 1,2-diaminoethane, N,N'-dialkyl(methylene dianiline), N,N'-dialkyl(1,4-diaminobenzene), and mixtures thereof;
wherein said compound having 2 isocyanate groups is selected from the group consisting of 2,4-toluene diisocyanate, 2,6-toluene diisocyanate, a dimer of toluene diisocyanate, diphenylmethane 4,4'-diisocyanate, 1,5-diisocyanato-naphthalene, 1,4-phenylene diisocyanate, 1,3-phenylene diisocyanato-naphthalene, 1,3-phenylene diisocyanate, dicyclohexylmethane diisocyanate, isophorone diisocyanate, 1,4-cyclohexane diisocyanate, 1,4-cyclohexanebis (methylene isocyanate), 1,3-bis(isocyanatomethyl)cyclohexane, hexamethylene 1,6-diisocyanate, 1,12-dodecane diisocyanate, 2,2,4-trimethyl-hexamethylene diisocyanate, 2,4,4-trimethyl-hexamethylene diisocyanate, 2-methyl-1,5-pentamethylene diisocyanate, dimer diisocyanate, hexamethyl diisocyanate, m-tetramethyl xylylene diisocyanate, 1,4-xylylene diisocyanate, and 1,3-xylylene diisocyanate, and mixtures thereof;
and wherein said isocyanate reactive silane is selected from the group consisting of
H$_2$NCH$_2$CH$_2$CH$_2$Si(OC$_2$H$_5$)$_3$;
H$_2$NCH$_2$CH$_2$CH$_2$Si(OCH$_3$)$_3$;

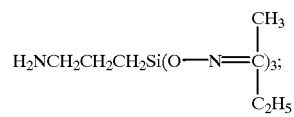

HSCH$_2$CH$_2$CH$_2$Si(OCH$_3$)$_3$;
HO(C$_2$H$_4$O)$_3$C$_2$H$_4$N(CH$_3$)(CH$_2$)$_3$Si(OC$_4$H$_9$)$_3$;
H$_2$NCH$_2$C$_6$H$_4$CH$_2$CH$_2$Si(OCH$_3$)$_3$;
HSCH$_2$CH$_2$CH$_2$Si(OCOCH$_3$)$_3$;
HN(CH$_3$)CH$_2$CH$_2$Si(OCH$_3$)$_3$;
HSCH$_2$CH$_2$CH$_2$SiCH$_3$(OCH$_3$)$_2$;
(H$_3$CO))$_3$SiCH$_2$CH$_2$CH$_2$NHCH$_2$CH$_2$CH$_2$Si(OCH$_3$)$_3$;
and mixtures thereof.

4. The method of claim 1 wherein said salt forming compound is selected from the group consisting of ammonia, trimethylamine, triethylamine, tripropylamine, triisopropylamine, tributylamine, triethanolamine, diethanolamine, acetic acid, formic acid, citric acid, octananoic acid, phenols, hydrochloric acid, hydrobromic acid, and hydrofluoric acid.

5. The method of claim 1 wherein said silyl terminated polyurethane has a urethane branching coefficient of about 1.7 to about 2.25.

6. The method of claim 1 wherein said silyl terminated polyurethane has a urethane branching coefficient of about 1.85 to about 2.0.

7. The silyl-terminated polyurethane prepared according to the method of claim 1.

8. The method of claim 1, wherein the isocyanate-terminated polyurethane prepolymer is chain extended, wherein the chain extender component is present both as components (a)(vi) and (b)(iv), and further comprising the step of:
when the reaction of the mixture of element (a) is about 80 to about 90% complete, adding to the mixture of element (a), a polyisocyanate adduct having greater than two isocyanate groups to form a branched chain extended isocyanate-terminated polyurethane prepolymer.

9. The method of claim 8, wherein said polyol component further comprises a compound having greater than two isocyanate reactive functional groups.

10. The method of claim 8, wherein said polyisocyanate component further comprises a compound having greater than two isocyanate groups.

11. The method of claim 8, wherein said chain extender component further comprises a chain extender having at least three isocyanate reactive groups.

12. The method of claim 8, wherein said polyisocyanate adduct is selected from the group consisting of a trimer of isophorone diisocyanate; a trimer of hexamethylene 1,6-diisocyanate, a trimer of m-tetramethylxylene diisocyanate, and mixtures thereof.

13. The method of claim 1, wherein the isocyanate-terminated polyurethane prepolymer is chain extended, wherein the chain extender component is present as component (a)(vi), further comprising the step of:

reacting at least a stoichiometrically equivalent amount of an isocyanate blocking agent with the reaction product of (a) comprising chain extended isocyanate-terminated polyurethane prepolymer to form a blocked chain extended isocyanate-terminated polyurethane prepolymer, and wherein the stable silyl-terminated polyurethane dispersion is formed by displacing the isocyanate blocking agent on the blocked chain extended isocyanate-terminated polyurethane prepolymer.

14. The method of claim 13, wherein the blocking agent is selected from the group consisting of phenol, nonyl phenol, methylethyl ketoxime, sodium bisulfate, and ε-caprolactam.

15. The method of claim 1, wherein the chain extender component is present as component (a)(vi) such that the isocyanate-terminated polyurethane prepolymer is chain extended and wherein the chain extended isocyanate-terminated polyurethane prepolymer of (a) is first reacted with the isocyanate-reactive silane compound to produce a silyl-terminated chain-extended polyurethane prepolymer prior to combination with the deionized water and salt forming compound of step (b).

16. The method of claim 1, wherein the chain entender component is present both as components (a)(vi) and (b)(iv).

* * * * *

UNITED STATES PATENT AND TRADEMARK OFFICE
CERTIFICATE OF CORRECTION

PATENT NO.: 6,046,295
DATED: April 4, 2000
INVENTOR(S): Kurt C. Frisch, Jr., Bruce H. Edwards, Ashok Sengupta, Lowell W. Holland, Richard G. Hansen, and Ian R. Owen It is certified that error appears in the above-identified patent and that said Letters Patent is hereby corrected as shown below:

Column 48, line 50, "glycols, -omega-diamino" should read --glycols, $\alpha$-omega-diamino--;

Column 48, line 55, "polyols, -omega-diamino" should read --polyols, $\alpha$-omega-diamino--; and Column 52, line 14, "entender" should read --extender--.

Signed and Sealed this

Third Day of April, 2001

Attest:

NICHOLAS P. GODICI

*Attesting Officer*     Acting Director of the United States Patent and Trademark Office